US009052927B2

(12) United States Patent
Baek et al.

(10) Patent No.: US 9,052,927 B2
(45) Date of Patent: Jun. 9, 2015

(54) MOBILE TERMINAL AND METHOD OF SETTING AN APPLICATION INDICATOR THEREIN

(75) Inventors: Songyi Baek, Seoul (KR); Jina Chang, Seoul (KR); Hyolin Kim, Seoul (KR); Hannah Na, Seoul (KR); Yongwon Cho, Seoul (KR); Hanseop Kim, Gwangmyeong-si (KR); Meejeong Kim, Seoul (KR); Changhee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 13/216,951

(22) Filed: Aug. 24, 2011

(65) Prior Publication Data

US 2012/0054663 A1 Mar. 1, 2012

(30) Foreign Application Priority Data

Aug. 24, 2010 (KR) ........................ 10-2010-0081975

(51) Int. Cl.
*G06F 9/44* (2006.01)
*G06F 3/0481* (2013.01)

(52) U.S. Cl.
CPC ............ *G06F 9/4443* (2013.01); *G06F 3/0481* (2013.01)

(58) Field of Classification Search
CPC ............................. G06F 3/0481; G06F 9/4443
USPC ................................... 715/772, 810, 784, 746
See application file for complete search history.

(56) References Cited

U.S. PATENT DOCUMENTS

| | | | | |
|---|---|---|---|---|
| 5,295,241 A | * | 3/1994 | Eagen et al. | 715/744 |
| 5,426,450 A | * | 6/1995 | Drumm | 345/168 |
| 5,426,725 A | * | 6/1995 | Kilgore | 715/203 |
| 5,479,598 A | * | 12/1995 | Feitelson et al. | 715/772 |
| 5,535,324 A | * | 7/1996 | Alvarez et al. | 715/209 |
| 5,596,702 A | * | 1/1997 | Stucka et al. | 715/746 |
| 5,600,778 A | * | 2/1997 | Swanson et al. | 715/762 |
| 5,644,334 A | * | 7/1997 | Jones et al. | 345/419 |

(Continued)

FOREIGN PATENT DOCUMENTS

| | | |
|---|---|---|
| CN | 1856048 A | 11/2006 |
| CN | 101606124 A | 12/2009 |

(Continued)

OTHER PUBLICATIONS

Sprint User Guide—HTC Hero—Mar. 31, 2010.*

*Primary Examiner* — Steven Sax
*Assistant Examiner* — David Choi
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; an input unit configured to enter an application indicator edit mode for editing application indicators providing information on corresponding applications; a display configured to display a first display region including a plurality of settable application indicators and a second display region including a guide screen indicating at least one of a display location and a display size of the settable application indicators on the guide screen when entering the edit mode; and a controller configured to receive a selection signal indicating a selection of a specific application indicator among the plurality of settable application indicators included in the first display region, and to determine whether the specific application indicator can be set on the guide screen included in the second display region.

19 Claims, 38 Drawing Sheets

(a)

(56) References Cited

U.S. PATENT DOCUMENTS

| | | | | |
|---|---|---|---|---|
| 5,644,736 A * | 7/1997 | Healy et al. | | 715/784 |
| 5,654,726 A * | 8/1997 | Mima et al. | | 345/2.2 |
| 5,668,961 A * | 9/1997 | Healy et al. | | 715/744 |
| 5,724,069 A * | 3/1998 | Chen | | 345/172 |
| 5,734,380 A * | 3/1998 | Adams et al. | | 715/804 |
| 5,737,555 A * | 4/1998 | Gregg et al. | | 715/856 |
| 5,745,115 A * | 4/1998 | Purple et al. | | 715/810 |
| 6,232,957 B1 * | 5/2001 | Hinckley | | 345/156 |
| 6,259,432 B1 * | 7/2001 | Yamada et al. | | 345/159 |
| 6,333,753 B1 * | 12/2001 | Hinckley | | 715/768 |
| 6,356,284 B1 * | 3/2002 | Manduley et al. | | 715/779 |
| 6,437,805 B1 * | 8/2002 | Sojoodi et al. | | 715/763 |
| 6,803,930 B1 * | 10/2004 | Simonson | | 715/784 |
| 7,020,844 B2 * | 3/2006 | Trevino et al. | | 715/772 |
| 7,392,483 B2 * | 6/2008 | Wong et al. | | 715/746 |
| 7,707,514 B2 * | 4/2010 | Forstall et al. | | 715/810 |
| 7,941,428 B2 * | 5/2011 | Huston | | 707/722 |
| 8,121,808 B2 * | 2/2012 | Huang et al. | | 702/141 |
| 8,266,537 B2 * | 9/2012 | Cho | | 715/762 |
| 8,549,429 B2 | 10/2013 | Tsuruta et al. | | |
| 2003/0067489 A1 | 4/2003 | Candy Wong et al. | | 345/765 |
| 2003/0095150 A1 * | 5/2003 | Trevino et al. | | 345/810 |
| 2006/0005207 A1 | 1/2006 | Louch et al. | | |
| 2006/0242597 A1 | 10/2006 | Park | | |
| 2007/0118813 A1 * | 5/2007 | Forstall et al. | | 715/805 |
| 2007/0202898 A1 * | 8/2007 | Bae et al. | | 455/466 |
| 2008/0168368 A1 | 7/2008 | Louch et al. | | |
| 2008/0195961 A1 * | 8/2008 | Bae et al. | | 715/769 |
| 2008/0218523 A1 * | 9/2008 | Zuverink | | 345/473 |
| 2008/0313144 A1 * | 12/2008 | Huston | | 707/3 |
| 2009/0024943 A1 * | 1/2009 | Adler et al. | | 715/764 |
| 2009/0254860 A1 * | 10/2009 | Seo et al. | | 715/810 |
| 2009/0260022 A1 * | 10/2009 | Louch et al. | | 719/328 |
| 2010/0017825 A1 * | 1/2010 | Shin et al. | | 725/47 |
| 2010/0077302 A1 * | 3/2010 | Bostrom et al. | | 715/700 |
| 2010/0088597 A1 * | 4/2010 | Shin et al. | | 715/704 |
| 2010/0090971 A1 * | 4/2010 | Choi et al. | | 345/173 |
| 2010/0095227 A1 * | 4/2010 | Park et al. | | 715/762 |
| 2010/0100841 A1 * | 4/2010 | Shin et al. | | 715/784 |
| 2010/0100903 A1 * | 4/2010 | Park et al. | | 725/37 |
| 2010/0122207 A1 * | 5/2010 | Kim et al. | | 715/788 |
| 2010/0134312 A1 * | 6/2010 | Park et al. | | 340/689 |
| 2010/0138763 A1 * | 6/2010 | Kim | | 715/765 |
| 2010/0169806 A1 * | 7/2010 | Ku et al. | | 715/762 |
| 2010/0169812 A1 * | 7/2010 | Park | | 715/764 |
| 2010/0180197 A1 * | 7/2010 | Ohashi | | 715/256 |
| 2010/0227556 A1 * | 9/2010 | Kim et al. | | 455/41.2 |
| 2010/0234076 A1 * | 9/2010 | Park et al. | | 455/566 |
| 2010/0287501 A1 * | 11/2010 | Seong et al. | | 715/810 |
| 2010/0293508 A1 * | 11/2010 | Hwang et al. | | 715/846 |
| 2010/0295789 A1 * | 11/2010 | Shin et al. | | 345/168 |
| 2010/0299598 A1 * | 11/2010 | Shin et al. | | 715/702 |
| 2010/0318601 A1 * | 12/2010 | Park et al. | | 709/203 |
| 2010/0325203 A1 * | 12/2010 | Park et al. | | 709/203 |
| 2011/0041078 A1 * | 2/2011 | Park et al. | | 715/746 |
| 2011/0041086 A1 * | 2/2011 | Kim et al. | | 715/764 |
| 2011/0047510 A1 * | 2/2011 | Yoon | | 715/835 |
| 2011/0055741 A1 * | 3/2011 | Jeon et al. | | 715/765 |
| 2011/0060994 A1 * | 3/2011 | Maxwell et al. | | 715/730 |
| 2011/0066976 A1 * | 3/2011 | Hwang | | 715/810 |
| 2011/0086648 A1 * | 4/2011 | Cho et al. | | 455/466 |
| 2011/0093227 A1 * | 4/2011 | Huang et al. | | 702/94 |
| 2011/0115817 A1 * | 5/2011 | Chun | | 345/629 |
| 2011/0119355 A1 * | 5/2011 | Hwang | | 709/219 |
| 2011/0185437 A1 * | 7/2011 | Tran et al. | | 726/28 |
| 2011/0193878 A1 * | 8/2011 | Seo et al. | | 345/619 |
| 2011/0199361 A1 * | 8/2011 | Shin | | 345/211 |
| 2011/0202852 A1 * | 8/2011 | Jeong et al. | | 715/751 |
| 2011/0202868 A1 * | 8/2011 | Yang et al. | | 715/781 |
| 2011/0202883 A1 * | 8/2011 | Oh et al. | | 715/846 |
| 2012/0054663 A1 * | 3/2012 | Baek et al. | | 715/772 |
| 2012/0268401 A1 * | 10/2012 | Itoh et al. | | 345/173 |

FOREIGN PATENT DOCUMENTS

| | | |
|---|---|---|
| CN | 101789992 A | 7/2010 |
| EP | 2 192 474 A2 | 8/2010 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

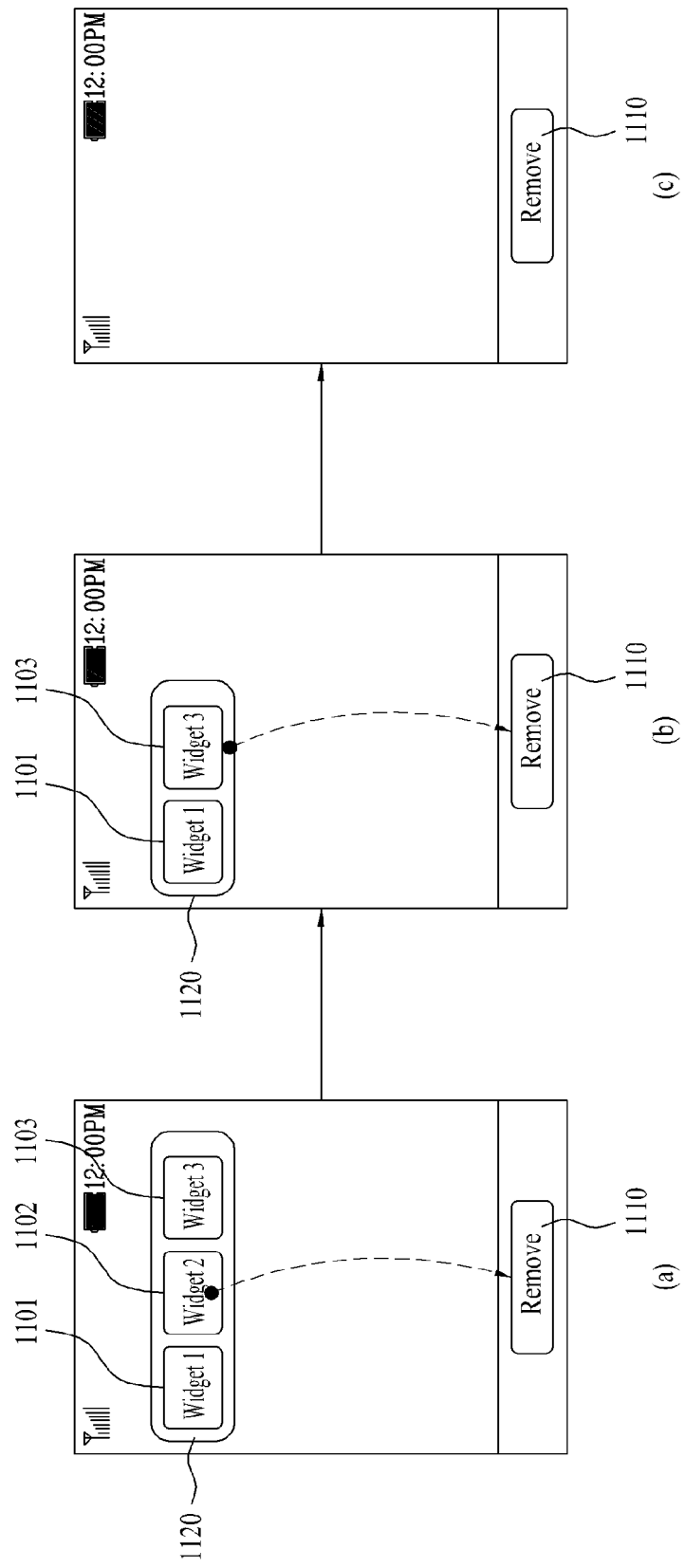

(a)

(b)

(a)

(b)

(a)

(b)

MOBILE TERMINAL AND METHOD OF SETTING AN APPLICATION INDICATOR THEREIN

Pursuant to 35 U.S.C. §119(a), this application claims the benefit of earlier filing date and right of priority to Korean Application No. 10-2010-0081975, filed on Aug. 24, 2010, the contents of which are hereby incorporated by reference herein in their entirety.

BACKGROUND OF THE INVENTION

1. Field of the Invention

The present invention relates to a mobile terminal and corresponding control method for displaying an edit mode screen in which application indicators such as widgets and shortcut icons can be arranged on the edit mode screen.

2. Discussion of the Related Art

Generally, terminals can be classified into mobile/portable terminals and stationary terminals. The mobile terminals can be classified into handheld terminals and vehicle mount terminals.

As functions of the terminal are diversified, the terminal is implemented as a multimedia player provided with composite functions such as photographing of photos or moving pictures, playback of music or moving picture files, game play, broadcast reception and the like.

The mobile terminals also include a graphical user interface (GUI) that allows the user to access and operate the different functions associated with the mobile terminal. However, the GUI is generally provided by the manufacturer of the terminal and is limited in its functionality.

SUMMARY OF THE INVENTION

Accordingly, one object of the present invention is to provide a mobile terminal and method of setting an application indicator therein that substantially obviate one or more problems due to limitations and disadvantages of the related art.

Another object of the present invention is to provide a mobile terminal and method for setting a set point of an application indicator.

To achieve these objects and other advantages and in accordance with the purpose of the invention, as embodied and broadly described herein, the present invention provides in one aspect a mobile terminal including a wireless communication unit configured to wirelessly communicate with at least one other terminal; an input unit configured to enter an application indicator edit mode for editing application indicators providing information on corresponding applications; a display configured to display a first display region including a plurality of settable application indicators and a second display region including a guide screen indicating at least one of a display location and a display size of the settable application indicators on the guide screen when entering the edit mode; and a controller configured to receive a selection signal indicating a selection of a specific application indicator among the plurality of settable application indicators included in the first display region, and to determine whether the specific application indicator can be set on the guide screen included in the second display region.

In another aspect, the present invention provides a method of controlling a mobile terminal, and which includes allowing, via a wireless communication unit on the mobile terminal, wireless communication with at least one other terminal; entering, via an input unit on the mobile terminal, an application indicator edit mode for editing application indicators providing information on corresponding applications; displaying, via a display on the mobile terminal, a first display region including a plurality of settable application indicators and a second display region including a guide screen indicating at least one of a display location and a display size of the settable application indicators on the guide screen when entering the edit mode; receiving, via a controller on the mobile terminal, a selection signal indicating a selection of a specific application indicator among the plurality of settable application indicators included in the first display region; and determining, via the controller, whether the specific application indicator can be set on the guide screen included in the second display region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 11A to 13B are diagrams of screen configurations of a process for combining a plurality of application indicators according to an embodiment of the present invention;

DETAILED DESCRIPTION OF THE INVENTION

In the following detailed description, reference is made to the accompanying drawing figures which form a part hereof, and which show by way of illustration specific embodiments of the invention. Wherever possible, the same reference numbers will be used throughout the drawings to refer to the same or similar parts.

Mobile terminals described in this disclosure include a mobile phone, a smart phone, a laptop computer, a digital broadcast terminal, a PDA (personal digital assistants), a PMP (portable multimedia player), a navigation system and the like. The configurations according to embodiments described in this disclosure are also applicable to such a stationary terminal as a digital TV, a desktop computer and the like.

Figure 1:
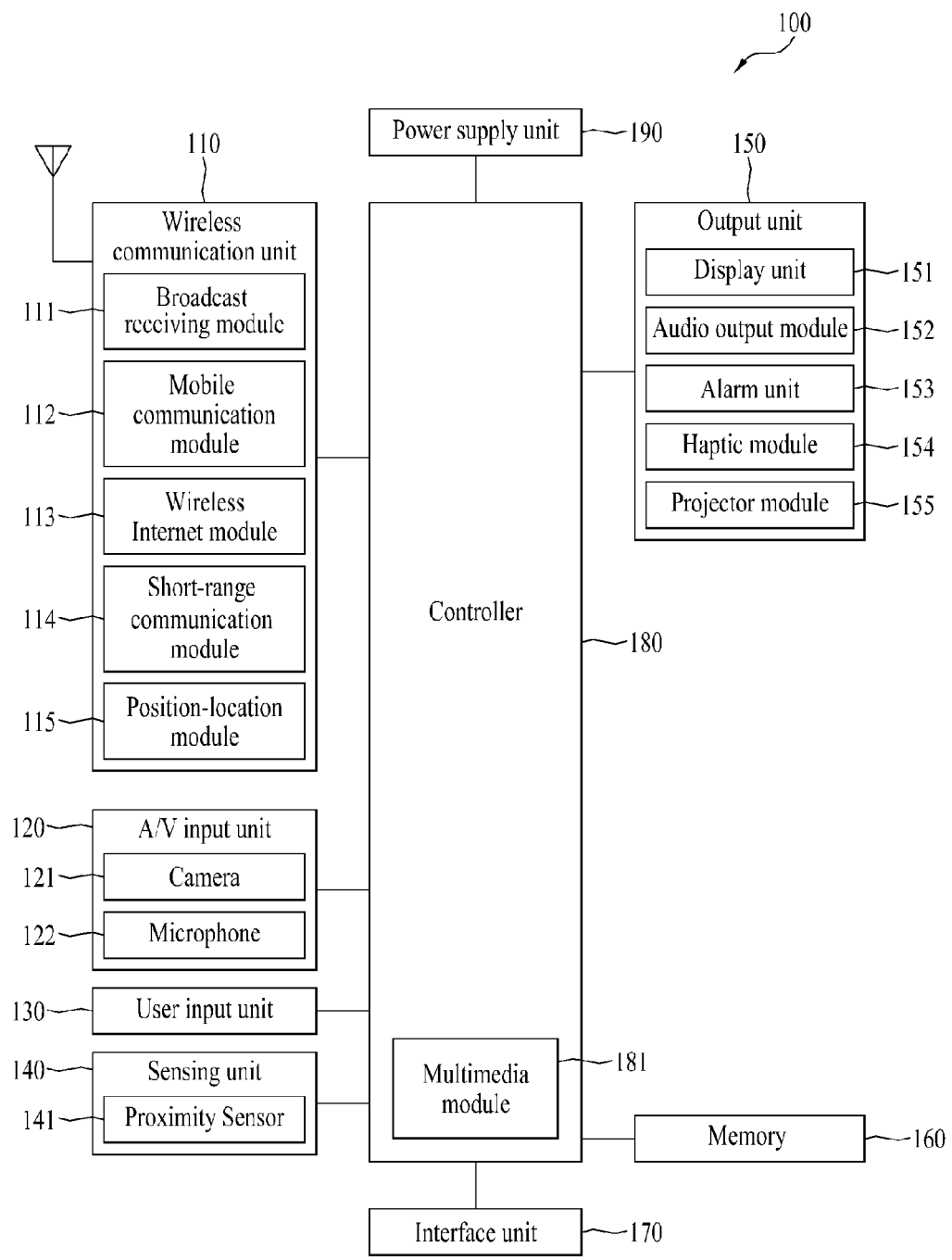
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In addition, the wireless communication unit 110 generally includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

Further, the broadcast receiving module 111 receives a broadcast signal and/or broadcast associated information from an external broadcast managing server via a broadcast channel. The broadcast channel may include a satellite channel and a terrestrial channel.

Also, the broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can also be implemented in various forms. For instance, broadcast associated information may include an electronic program guide (EPG) of the digital multimedia broadcasting (DMB) system and an electronic service guide (ESG) of the digital video broadcast-handheld (DVB-H).

The broadcast receiving module 111 may be configured to receive broadcast signals transmitted from various types of broadcast systems. In a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®) system and the integrated services digital broadcast-terrestrial (ISDB-T) system. Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device such as the memory 160. The mobile communication module 112 transmits/receives wireless signals to/from one or more network entities (e.g., base station, external terminal, server, etc.). Such wireless signals may represent audio, video, and data according to text/multimedia message transceivings, among others.

In addition, the wireless internet module 113 supports Internet access for the mobile terminal 100 and may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few. The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 generally includes assorted noise removing algorithms to remove noise generated while receiving the external audio signal.

Further, the user input unit 130 generates input data responsive to user manipulation of an associated input device or devices. Examples of such devices include a keypad, a dome switch, a touchpad (e.g., static pressure/capacitance), a jog wheel, a jog switch, etc.

Also, the sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is opened or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), the display unit 151 can be used as an input device as well as an output device. In this instance, the touch sensor can be configured as a touch film, a touch sheet, a touchpad or the like.

Further, the touch sensor can be configured to convert a pressure applied to a specific portion of the display unit 151 or a variation of a capacitance generated from a specific portion of the display unit 151 to an electric input signal. Moreover, the touch sensor can detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can determine whether a prescribed portion of the display unit 151 is touched.

Referring again to FIG. 1, the proximity sensor 141 can be provided to an internal area of the mobile terminal 100 enclosed by the touchscreen or around the touchscreen. In more detail, the proximity sensor 141 detects a presence or non-presence of an object approaching a prescribed detecting surface or an object existing around the proximity sensor using an electromagnetic field strength or infrared ray without mechanical contact. Hence, the proximity sensor 141 has a durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, the proximity of a pointer can be detected using a variation of electric field according to the proximity of the pointer. In this instance, the touchscreen (touch sensor) can be classified as the proximity sensor.

In the following description, when an action that a pointer approaches without contacting with the touchscreen is recognized as located on the touchscreen is named a 'proximity touch'. In addition, an action that a pointer actually touches the touchscreen is named a 'contact touch'. The position on the touchscreen proximity-touched by the pointer means the position of the pointer which vertically opposes the touchscreen when the pointer performs the proximity touch.

Also, the proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

Further, the audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

In addition, the alarm unit 153 is output a signal for announcing the occurrence of a particular event associated with the mobile terminal 100. Typical events include a call received event, a message received event and a touch input received event. The alarm unit 153 can also output a signal for announcing the event occurrence using vibration as well as video or audio signal. The video or audio signal can also be output via the display unit 151 or the audio output unit 152. Hence, the display unit 151 or the audio output module 152 can be regarded as a part of the alarm unit 153.

In addition, the haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

In addition, the projector module 155 performs an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

Also, the memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may also be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on the Internet.

The interface unit 170 can be implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may also be configured using a wired/wireless headset port, an external charger port, a wired/wireless data port, a memory card port, a port for coupling to a device having an identity module, audio input/output ports, video input/output ports, an earphone port and/or the like.

In addition, the identity module is a chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

Further, the controller 180 generally controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input performed on the touchscreen as characters or images, respectively. In addition, the power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Interconnected operational mechanism between the display unit 151 and the touchpad will now be explained with reference to FIG. 2. In particular, FIG. 2 is front-view diagram of the mobile terminal 100 according to one embodiment of the present invention.

Also, various kinds of visual information can be displayed on the display unit 151. The information can be displayed in characters, numerals, symbols, graphics, icons and the like. In order to input the information, at least one of the characters, numerals, symbols, graphics and icons are represented as a single predetermined array to be implemented in a keypad formation. In addition, this keypad formation can be called 'soft keys'.

Figure 2:
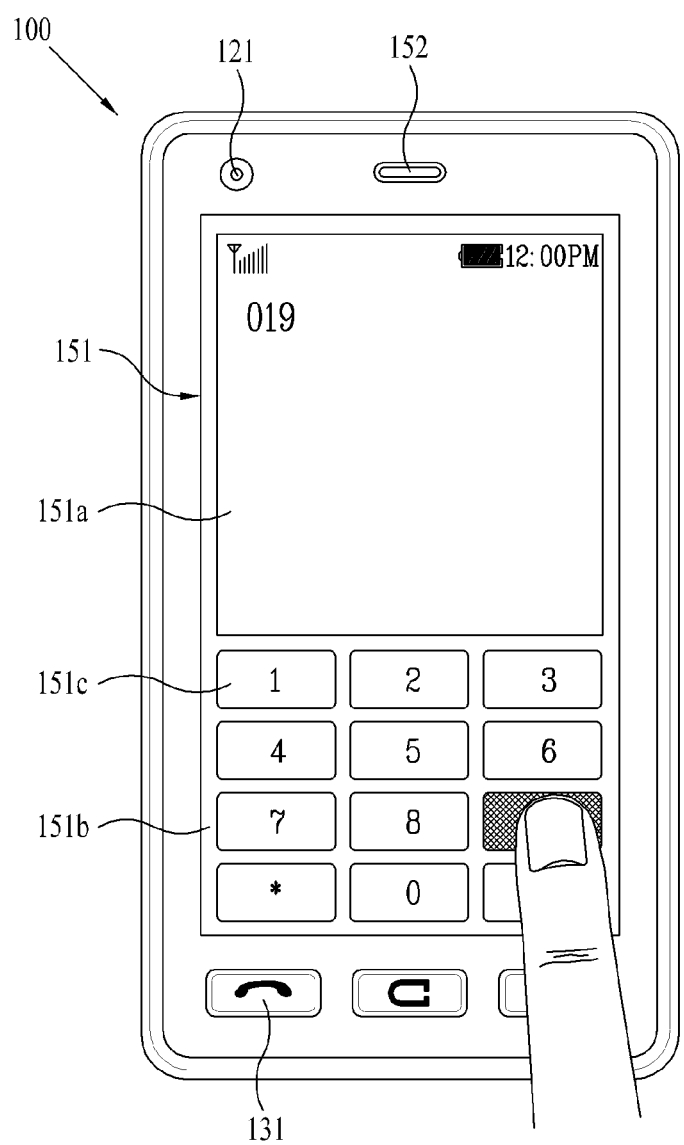
FIG. 2 is front diagram of a mobile terminal according to one embodiment of the present invention.

In addition, FIG. 2 shows that a touch applied to a soft key is input through a front face of a terminal body. The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is output to the input window 151b. If the soft key 151c is touched, a digit corresponding to the touched soft key is output to the output window 151a. If the first manipulating unit 131 is manipulated, a call connection for the phone number displayed on the output window 151a is attempted.

Also, a mobile terminal mentioned in the following description can include at least one of the components shown in FIG. 1. Moreover, the mobile terminal 100 can include a touchscreen capable of performing both a display function of the display unit 151 and a user action input function of the user input unit 130. As the touchscreen is one example of the display unit 151, the same reference number '151' will be given to the touchscreen.

In one embodiment, an application mentioned in this disclosure is a software program previously stored in the mobile terminal 100 or a software program downloaded from an external server. In addition, the application can include a function or operation that can be performed by the mobile terminal 100.

For instance, terminal operation related applications include a phonebook application, a message application, a phone application, a voice recording application, an album application and the like. In another instance, information provision related applications include a stock information providing application, a weather/clock information providing application, a real-time news providing application, a real-time traffic condition providing application and the like.

Also, an application indicator mentioned in this disclosure is an indicator that provides information on a corresponding application. In addition, the application indicator can be represented by such a display element as an icon (e.g., an icon including an image, an icon including a text, etc.), a text, a still picture, a video, a flash and the like.

For instance, an application indicator can include a widget or a shortcut. In this instance, the widget can display information provided via an application while executing the corresponding application or receive an input of a control command for an application while executing the corresponding application. In addition, the shortcut icon/display element is a shortcut to a corresponding application. Moreover, at least one widget or shortcut can be set for one application.

The mobile terminal 100 mentioned in this disclosure can configure a plurality of screens or pages in a standby mode or a menu search mode. In addition, at least one application indicator can be set on a plurality of screens. In this instance, different wallpapers or the same image can be displayed on the screens. Alternatively, one whole image or page can be scrollably displayed to appear as the screens are turning or pages in a book are being flipped. Further, a single application indicator can be set on one screen or can be set on each of a plurality of the screens.

Figure 3:
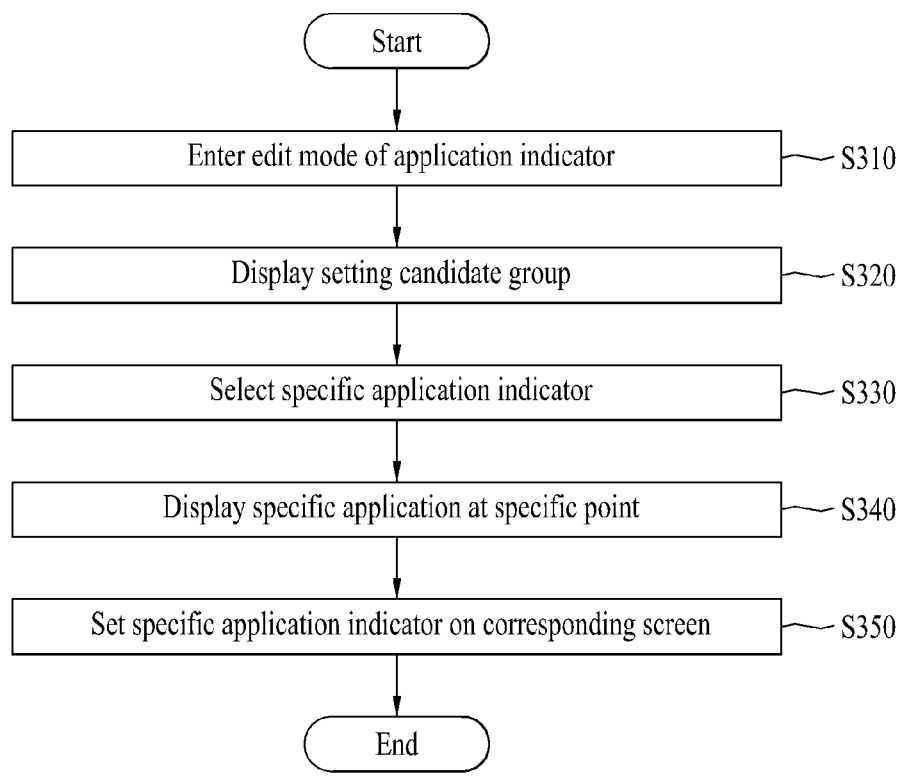
FIG. 3 is a flowchart illustrating a method of setting an application indicator in a mobile terminal according to one embodiment of the present invention.

A method of setting an application indicator according to an embodiment of the present invention will now be explained with reference to the flowchart in FIG. 3. Referring to FIG. 3, the controller 180 enters an edit mode for an application indicator (S310).

In this instance, the controller 180 displays an edit mode screen in which application indicators can be added/deleted/shifted in position and the like. Further, the edit mode may be entered based on a user input/action. For instance, the user action can include a pattern corresponding to the edit mode enter command. The user action includes one of a touch action on a random point on a screen (e.g., a touch of a predetermined count, a touch for a predetermined duration, a touch at a predetermined pressure, a touch & drag in a predetermined distance, a touch & drag at a predetermined speed, etc.), a terminal shaking action (e.g., a shaking of a predetermined count, a shaking at a predetermined sped), a terminal inclining action (e.g., an inclination in a predetermined direction, an inclination of predetermined degrees, etc.) and the like. In addition, the user action can include a selection action on a menu item or a key zone corresponding to the edit mode enter command. Voice commands, titling the terminal, shaking the terminal, etc. can also be used to enter the edit mode according to different embodiments of the present invention.

Further, when entering the edit mode while displaying a specific screen, the controller 180 enters the edit mode for the specific screen as a default. Alternatively, the controller 180 enters the edit mode for a basic screen (e.g., a screen corresponding to one page in general) as a default. The controller 180 can also enter the edit mode for a screen selected by a user from a plurality of editable screens.

Figure 4A:
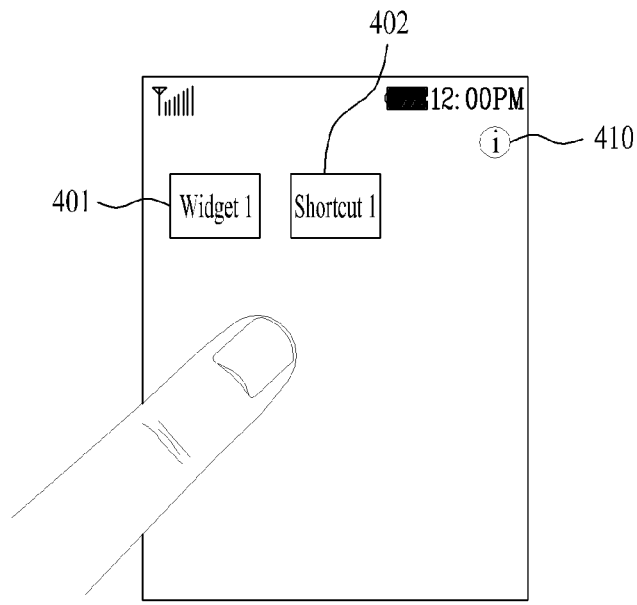
FIGS. 4A to 4C are diagrams of screen configurations when entering a widget edit mode according to an embodiment of the present invention.
Figure 4B:
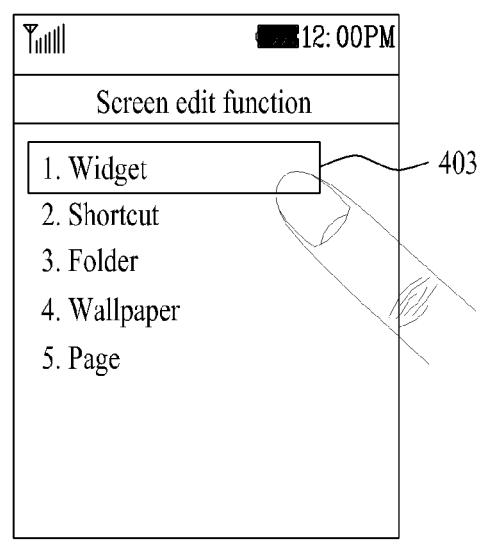
Figure 4C:
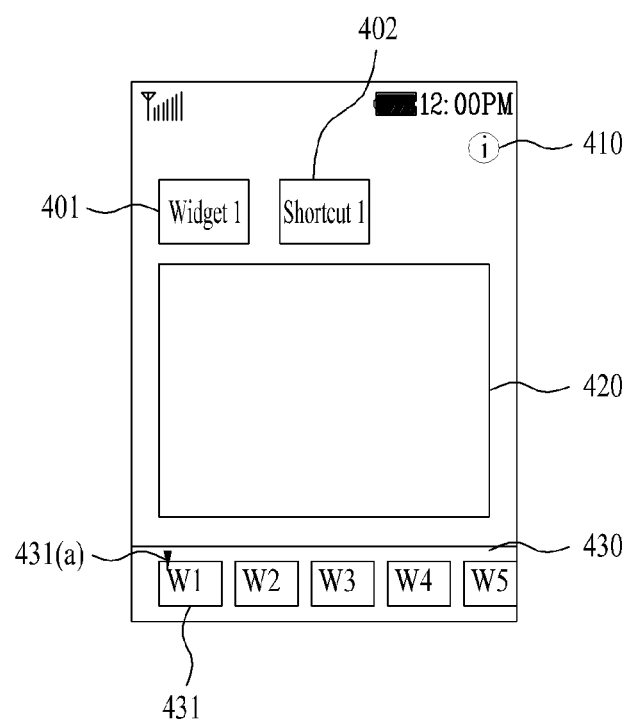

In more detail, FIGS. 4A to 4C are diagrams of screen configurations when entering a widget edit mode according to an embodiment of the present invention. Referring to FIG. 4A, when receiving a user touch action for a predetermined duration (or a predetermined count) on a random point of a screen, the controller 180 can enter an edit mode of an application indicator. FIG. 4A also illustrates a widget 401 and a shortcut 402. An information icon 410 is also displayed.

Referring to FIG. 4B, having entered the edit mode of the application indicator, the controller 180 displays an editable target list on the screen. For instance, a widget, a shortcut, a folder, a wallpaper, a page and the like can be included in the editable target list.

The following description assumes the widget 403 is selected from the editable target list. Referring to FIG. 4C, as the widget 403 is selected from the editable target list, the controller 180 displays a settable region 420 for setting the application indicator and displays a setting candidate group 430 on a prescribed region of the screen. Further, referring to FIG. 4C, an identifiable mark 431(*a*) indicates the application indicator 'widget (W1)' 431 has been previously set on an edit target screen in the settable candidate group 430.

Referring back to FIG. 3, when entering the edit mode, the controller 180 displays a setting candidate group including a plurality of application indicators that can be set on a prescribed region of the touchscreen 151 (S320). In this instance, the application indicators included in the setting candidate group may correspond to the indicators downloaded from external servers or indicators previously stored in the terminal 100. In addition, the application indicators included in the setting candidate group can include an application indicator previously set on the screen.

A specific application indicator included in the setting candidate group can also include at least one application indicator. For instance, the specific application indicator can be an application indicator corresponding to each application belonging to the same category (e.g., weather, health, stock, sports, etc.) or can include at least one application indicator about the same application, and which differs in size.

Further, in the displaying step S320, the controller 180 can display a plurality of the application indicators included in the setting candidate group such that the corresponding application indicators can be scrolled in a predetermined direction based on a touch & drag or flicking action input from a user. Alternatively, the controller 180 can display a plurality of the application indicators included in the setting candidate group by scrolling the corresponding application indicators based on a preset scroll direction and a preset scroll speed. The controller 180 can also display information on each corresponding application indicator included in the setting candidate group.

Further, in the displaying step S320, the controller 180 can display guide information on the application indicator settable region (or a region where the application indicator can be situated) on the screen. For instance, the controller 180 can display the rest of the screen except the display region of the preset application indicator and the basic display region (e.g., a terminal status information display region, etc.) as the application indicator settable region.

Figure 5A:
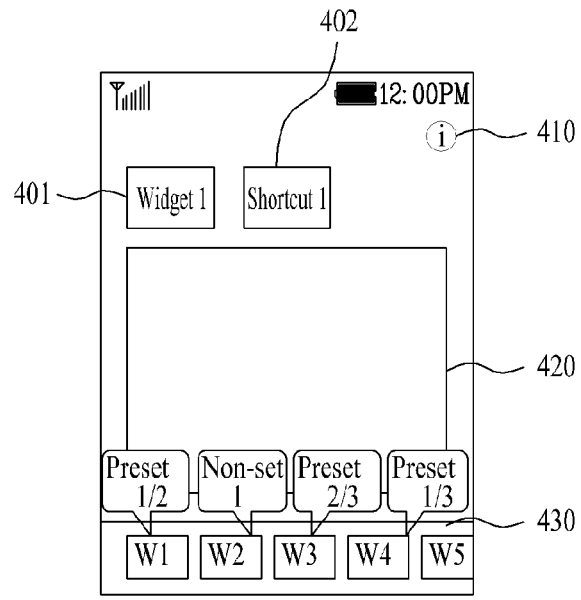
FIGS. 5A to 5C are diagram of screen configurations for displaying widget related information on a widget included in a setting candidate group according to an embodiment of the present invention.
Figure 5A:
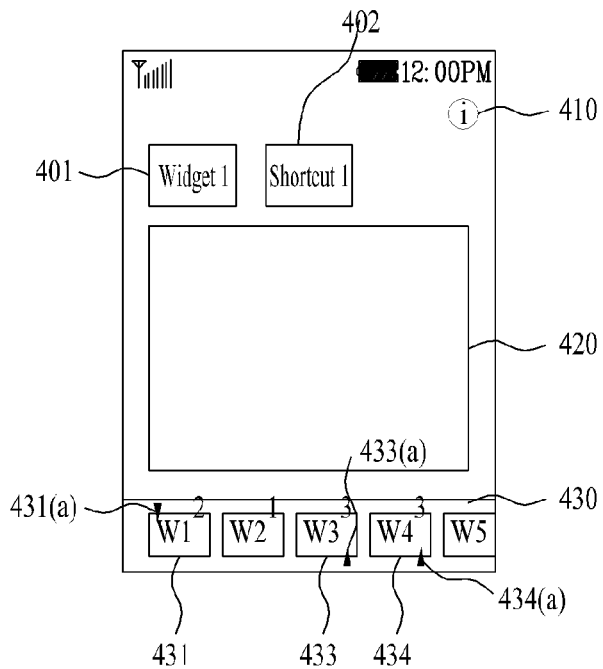
Figure 5B:
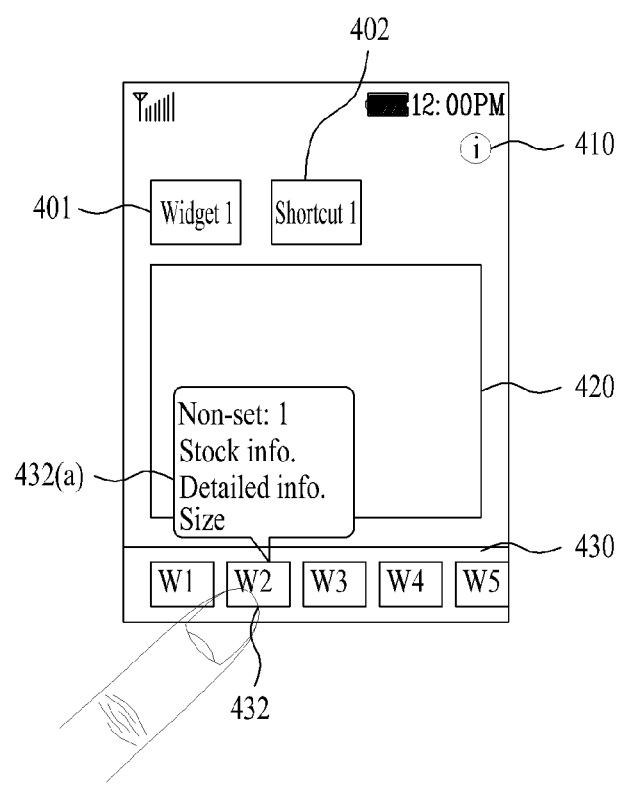
Figure 5C:
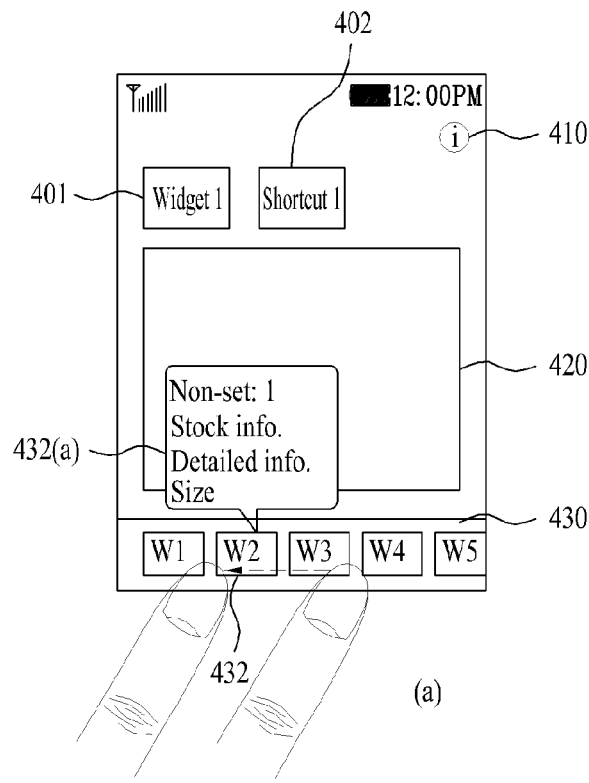
Figure 5C:
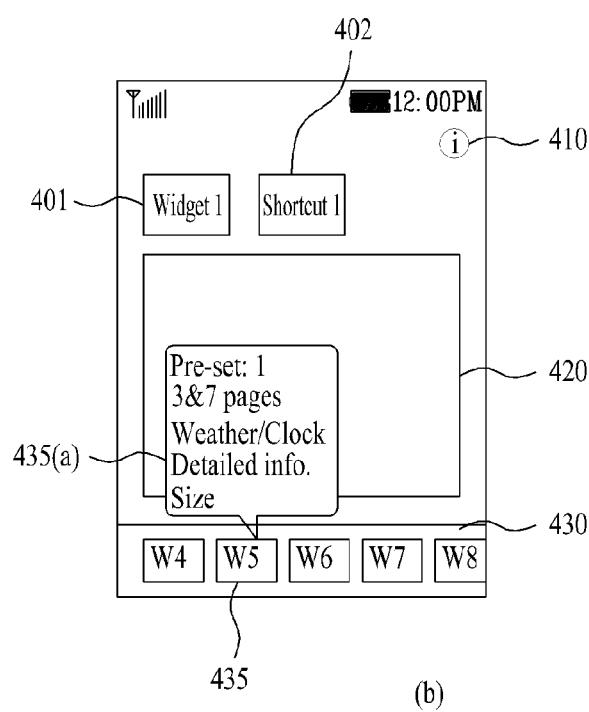

In more detail, FIGS. 5A to 5C are diagrams of screen configurations for displaying widget related information on a widget included in a setting candidate group according to an embodiment of the present invention. Referring to FIGS. 5A to 5C, widgets included in a setting candidate group can include information (e.g., name, representative image, etc.) indicating an application corresponding to each of the widgets.

Referring to FIG. 5A, the controller 180 can display related information indicating whether each widget included in the setting candidate group 430 is previously set on a specific screen (i.e., a presence or non-presence of a presetting of the corresponding widget on the specific screen), information indicating a presetting count if each widget included in a setting candidate group 430 is previously set on a specific screen, information indicating the number of included widgets (i.e., as mentioned in the foregoing description, a plurality of widgets can be included), and the like.

In particular, FIG. 5A(a) shows that the related information is displayed as a word balloon and FIG. 5A(b) shows that identifiable marks 431(*a*), 433(*a*) and 434(*a*) for indicating a presence or non-presence of a presetting and the presetting numbers are directly displayed on the corresponding widgets 431, 433 and 434, respectively.

In particular, referring to FIG. 5A(b), the identifiable mark 431(*a*) indicating a presence or non-presence of a presetting of the widget 431 set on the edit target screen can be provided to a top side of the corresponding widget, while the rest of the identifiable marks 433(*a*) and 434(*a*) are provided to bottom sides of the widgets 433 and 434, respectively.

Referring to FIG. 5B, when receiving a user selection action (e.g., a touch action) on a specific widget 432 of the widgets included in the setting candidate group 430, the controller 180 can display related information 432(*a*) on the specific widget 432. In this instance, the related information can include a presence or non-presence of a presetting, a preset screen (page) number, a presetting number, a name/detailed information of a corresponding application, a real display size when displaying a corresponding widget on a specific screen and the like.

Referring to FIG. 5C, the controller 180 can display related information on a widget positioned in a specific order among widgets included in the setting candidate group 430. In particular, the controller 180 can display related information 432(*a*) on a second-positioned widget (W2) 432 among the currently displayed widgets W1 to W5. When the user performs a widget display shift command action (e.g., a touch & drag action), the controller 180 can display related information 435(*a*) on a second-positioned widget (W5) 435 among the displayed widgets widgets W4 to W8.

Meanwhile, a recommended widget, a widget having a download count greater than a predetermined count, a widget settable within a settable region (e.g., when a widget display size is smaller than the settable region) and the like among the widgets included in the setting candidate group can be identifiably displayed or indicated. Moreover, the number of widgets displayable at a time can be adjusted. For instance, the number of the widgets displayable at a time can be adjusted by a user setting or a random decision made by the controller 180.

Referring again to FIG. 3, the controller 180 receives a user selection action on a specific one of the application indicators included in the setting candidate group (S330). In this instance, the selection action is for selecting an application indicator, which is to be set on a screen as a target of an edit mode. In addition, the selection action can be performed on at least two application indicators included in the setting candidate group.

For instance, the selection action can include a touch action on each specific application indicator and a specific point or a touch & drag action from a specific application indicator to a specific point on a screen. In this instance, the specific point can be situated within the settable region of the application indicator. Alternatively, the selection action can just include a touch action on a specific application indicator.

Optionally, the controller 180 can display the guide information for the application indicator after completing the selection step S330 of the specific application indicator. Afterwards, as shown in FIG. 3, the controller 180 displays the specific application indicator selected in the selecting step S330 on a specific point of the screen (S340).

In this instance, the specific point can include a point touched by the touch action or the touch & drag action input in the selection (see step S330) of the specific application indicator or a point at which the touch & drag action ends. Moreover, the specific point is preferably situated within the settable region of the specific application indicator.

The specific point can also include a point randomly decided by the controller 180. For instance, the specific point can include the point most suitable for the specific application indicator in consideration of the positions of the preset application indicators. In this instance, a user selection action on the specific point may not be necessary.

The displaying step S340 can also display an estimated screen as a preview state when setting the specific application indicator before actually the setting of the specific application indicator on the screen. Further, the controller 180 can display the guide information during the displaying step S340 of the specific application indicator.

The controller 180 then sets the specific application indicator displayed in the displaying step S340 as an application indicator for a currently displayed screen (S350). Therefore, a specific application indicator is further set and displayed on the currently displayed screen in addition to the preset application indicator.

Further, in the setting step S350, the controller 180 can set the specific application indicator to be displayed at the point where the specific application indicator in the displaying step S340 is situated. The controller 180 can also output settability indication information while displaying the specific application indicator. In addition, the controller 180 can set the specific application indicator as the application indicator for the currently displayed screen after the settability indication information has been output.

For instance, the settability indication information can use the identifiable mark for the settable region of the application indicator and can output information indicating that the specific application indicator is in a settable status with voice, text, an image, a vibration and the like.

Moreover, when receiving an input for the selection action S330 of the specific application indicator as a touch & drag action from the specific application indicator to a specific point and a sequential touch action on the specific application indicator and the specific point, the controller 180 can stop the display and setting of the specific application indicator if the specific point is released from the touch before the output of the settability information.

Figure 6A:
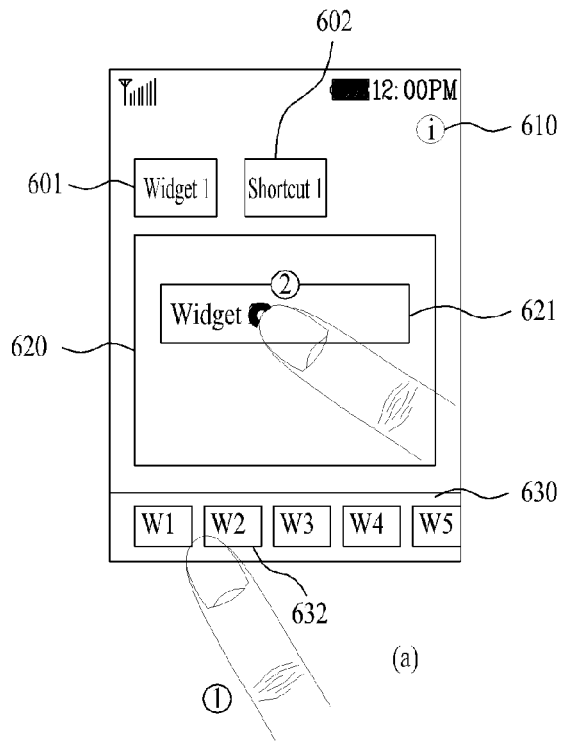
FIGS. 6A to 6C are diagrams of screen configurations for setting a widget of a corresponding screen to a specific widget selected from a setting candidate group according to an embodiment of the present invention.
Figure 6A:
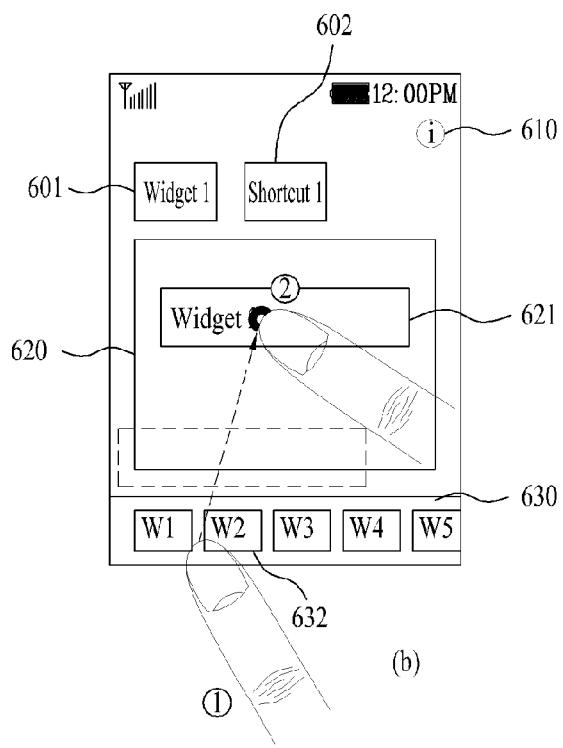
Figure 6B:
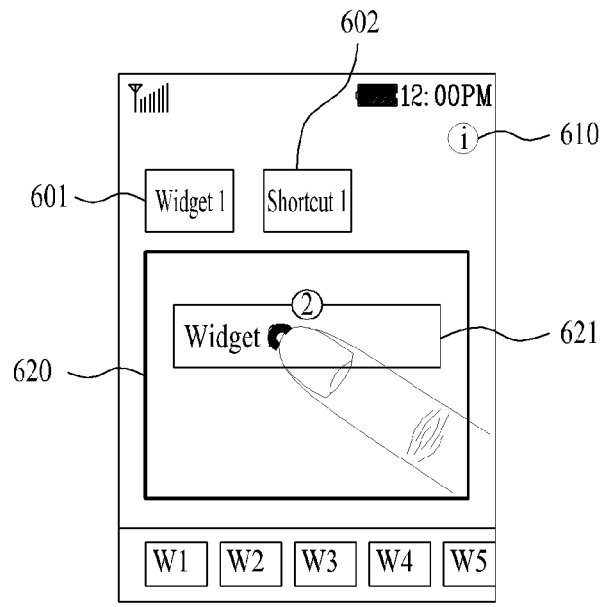
Figure 6B:
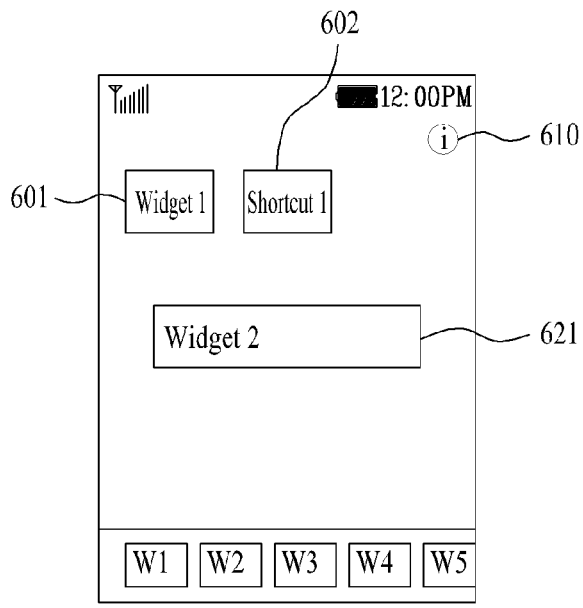
Figure 6C:
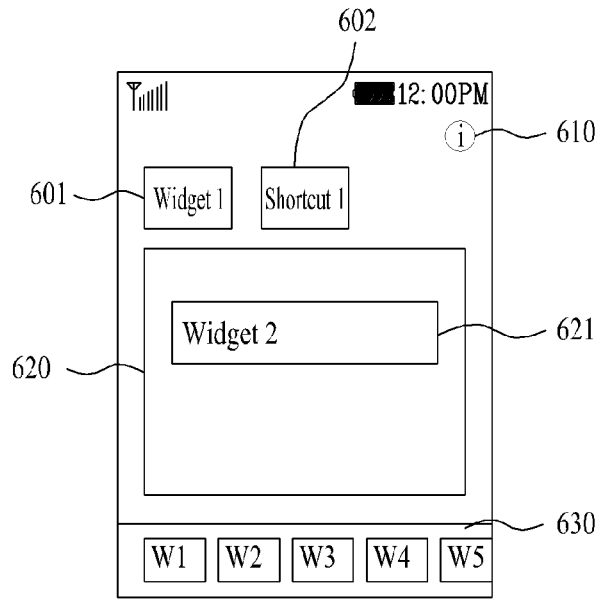
Figure 6C:
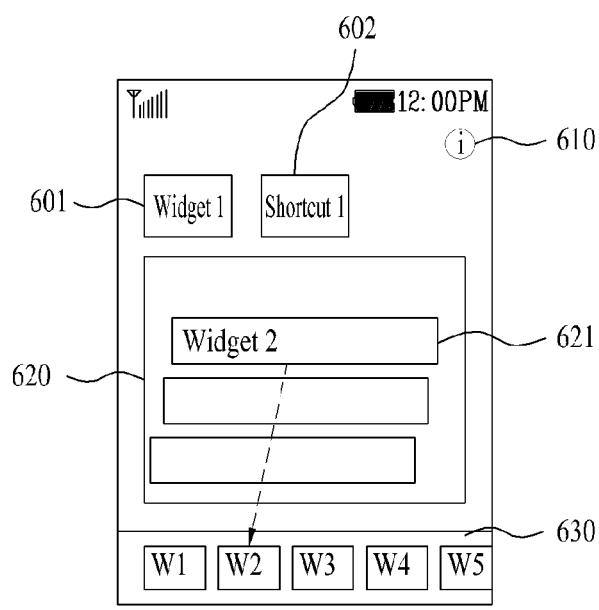

In more detail, FIGS. 6A to 6C are diagrams of screen configurations for setting a widget of a corresponding screen to a specific widget selected from a setting candidate group according to an embodiment of the present invention.

Referring to FIG. 6A(a), when the user performs a touch action ① on a widget (W2) 632 of a setting candidate group 630 and a touch action ② on a specific point within a settable region 620, the controller 180 can display a widget (W2) 621 in a real display size corresponding to the widget (W2) 632 at the specific point.

Referring to FIG. 6A(b), when receiving a user touch & drag action ①→② from the widget (W2) 632 of the setting candidate group 630 to a specific point within the settable region 620, the controller 180 can display a widget (W2) 621 in a real display size corresponding to the widget (W2) 632 at the specific point. In doing so, the widget (W2) 621 in the real display size can be shifted and displayed to correspond to the touch & drag action.

Referring to FIG. 6B(a), when receiving a user touch to a specific point for a predetermined duration or a predetermined count of touches to the specific point while the widget (W2) is displayed at the specific point, the controller 180 can display a thick outline of the settable region 620 to indicate that the widget (W2) 621 is stable on a current screen (one example of the settability information).

When the specific point is released from the touch after the thick outline of the settable region 620 has been displayed, or if the touch to the specific point is maintained until the outline of the settable region 620 is displayed thick, the controller 180 can set the widget (W2) 621 as a widget corresponding to the current screen as shown in FIG. 6B(b).

Referring to FIG. 6C(a), if the touch to the specific point is released before the output of the settability information (e.g., the outline of the settable region 620 is displayed thick) while the widget (W2) 621 is displayed, the controller 180 can not further display the widget (W2) 621 on the screen (FIG. 6C(b)).

In particular, referring to FIG. 6C(b), the widget (W2) 621 can be shifted and displayed as if entering the corresponding position of the widget (W2) 632 within the setting candidate group 630.

Referring back to FIG. 3, if the selected specific application indicator (step S330) includes a plurality of application indicators (hereinafter named subordinate application indicators), the controller 180 can set an application indicator to a prescribed one of a plurality of the subordinate application indicators.

For instance, if a category of the selected specific application indicator is 'weather', a plurality of subordinate application indicators each having the category of weather can be included in the specific application indicator. Further, if the selected specific application indicator has a plurality of real display sizes, a plurality of subordinate application indicators respectively corresponding to the real display sizes can be included in the specific application indicator.

Further, in the setting step S350, the controller 180 can also set a prescribed one of a plurality of the subordinate application indicators according to a user selection or a random selection made by the controller 180. In particular, the controller 180 can select a subordinate application indicator having a real display size settable within the settable region, a subordinate application indicator having a highest frequency of download, or a recommended subordinate application indicator from a plurality of the subordinate application indicators.

In the following description, when a specific application indicator selected from a setting candidate group includes a plurality of subordinate application indicators differing from each other in real display size, screen configurations for setting a prescribed subordinate application indicator are explained with reference to FIGS. 7A to 7C.

Figure 7A:
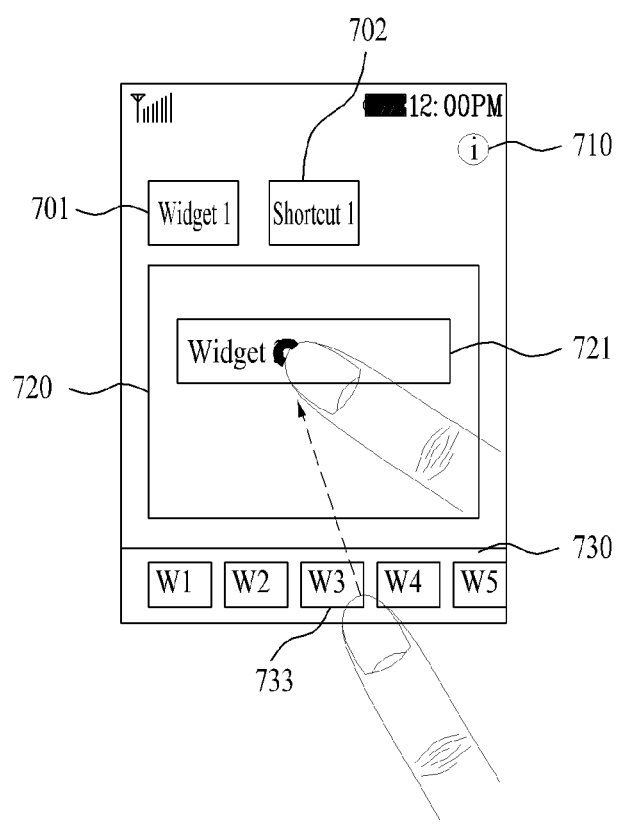
FIGS. 7A to 7E are diagrams of screen configurations for setting a prescribed widget among widgets differing from each other in size according to an embodiment of the present invention.
Figure 7B:
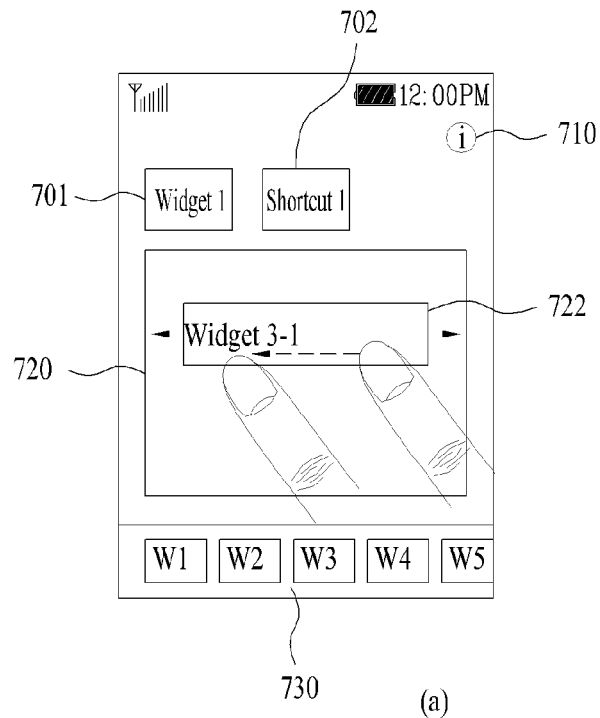
Figure 7B:
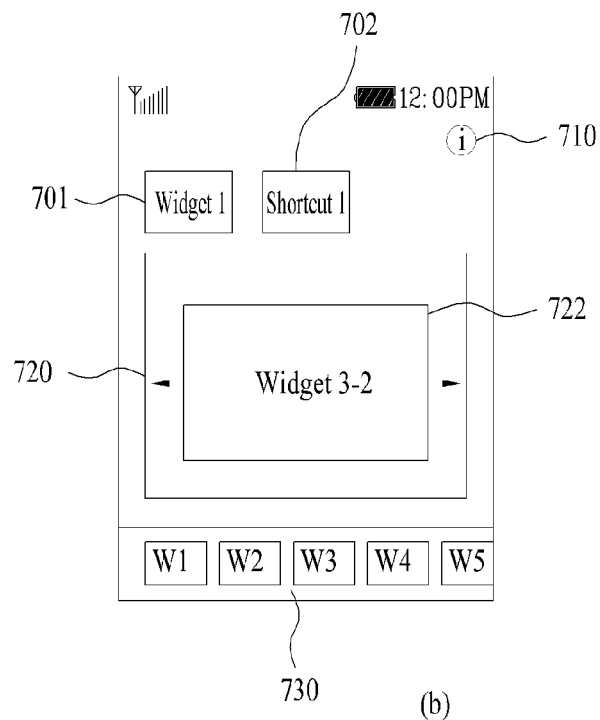
Figure 7C:
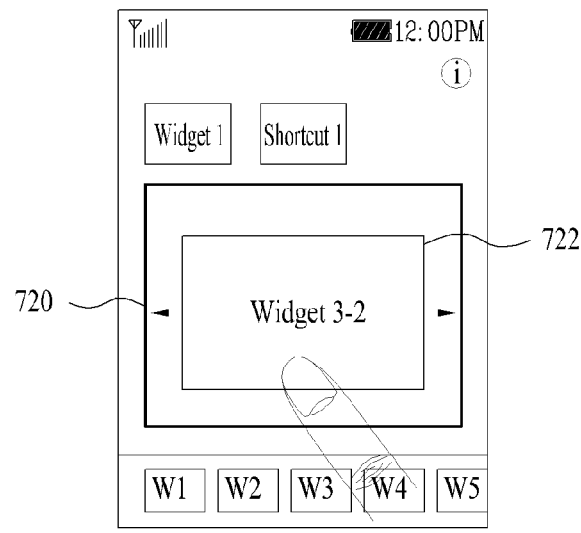
Figure 7C:
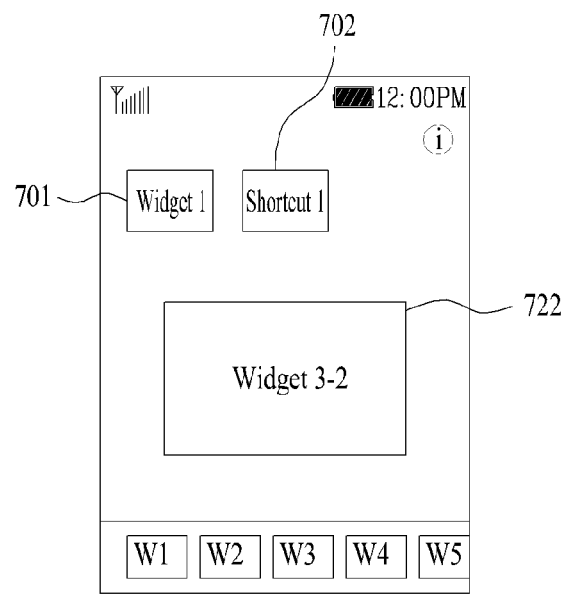

In particular, FIGS. 7A to 7C are diagrams of screen configurations for setting a prescribed one of a plurality of widgets if specific widgets selected from a setting candidate group include a plurality of the widgets differing from each other in size according to an embodiment of the present invention.

The following description assumes the application indicator is a widget, and a plurality of subordinate widgets (W3-1) 721 and (W3-2) 722 differing from each other in real display size are included in a widget (W3) 733.

Referring to FIG. 7A, when a touch & drag user action on the widget (W3) 733 included in a setting candidate group 730 to a specific point within a settable region 720 is received (i.e., one example of a selection action on the widget (W3) 733), the controller 180 displays a first subordinate widget (W3-1) 721 in a real display size corresponding to the widget (W3) 733 within the settable region 720 (see FIG. 7B(a)). The first subordinate widget may be the same as or not the same as the widget (W3).

Referring to FIG. 7B, when a touch & drag action or a flicking action in a prescribed direction in FIG. 7A(a) is received or a direction indicator ◀ or ▶ is input, the controller 180 can display a second subordinate widget (W3-2) 722 situated next to the first subordinate widget (W3-1) 721 within the settable region 720 as shown in FIG. 7B(b). Therefore, a user can sequentially check a plurality of subordinate widgets by inputting the touch & drag action or the direction indicator select action.

Referring to FIG. 7B(b), when receiving a touch action on the second subordinate widget (W3-2) 722 while the second subordinate widget (W3-2) 722 is displayed, the controller 180 can set the second subordinate widget (W3-2) 722 as a widget for a current screen as shown in FIG. 7C(a).

In particular, the touch action in FIG. 7C(a) can have a touch pattern (e.g., a touch maintained over a predetermined duration, touches performed over a predetermined count, etc.) for commanding a setting on a current screen. Moreover, in FIG. 7C, after the outline of the settable region 720 has been displayed thick, for example, of the settability information (FIG. 7C(a)), the controller 180 can set the second subordinate widget (W3-2) 722 as a widget for the current screen (FIG. 7C(b)).

Figure 7D:
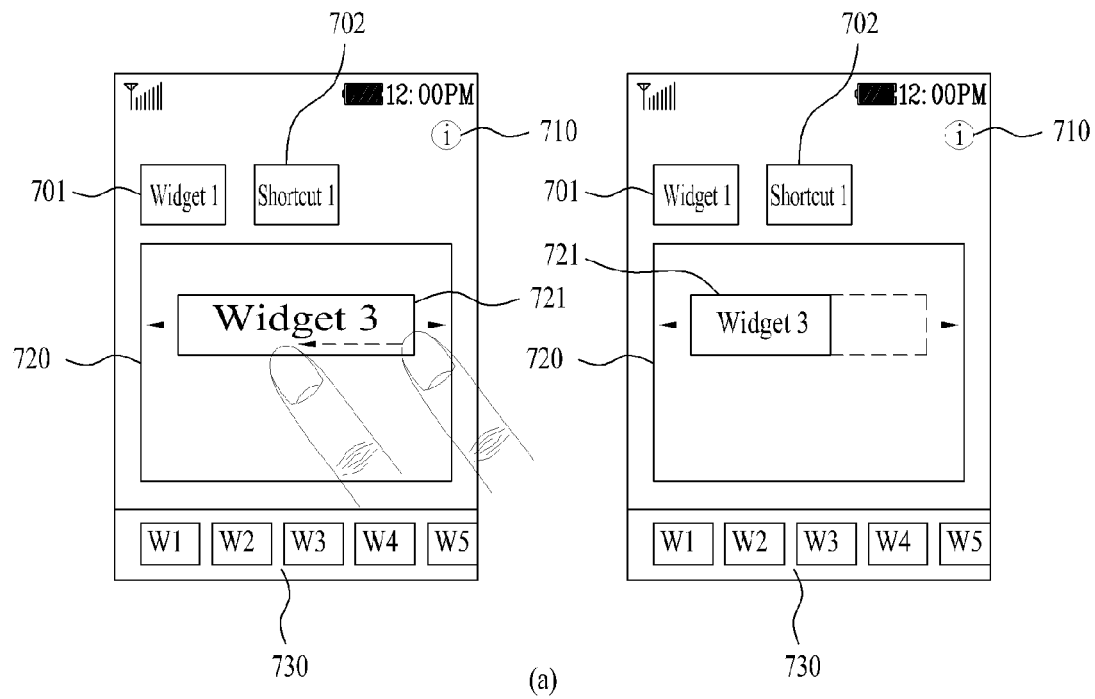
Figure 7D:
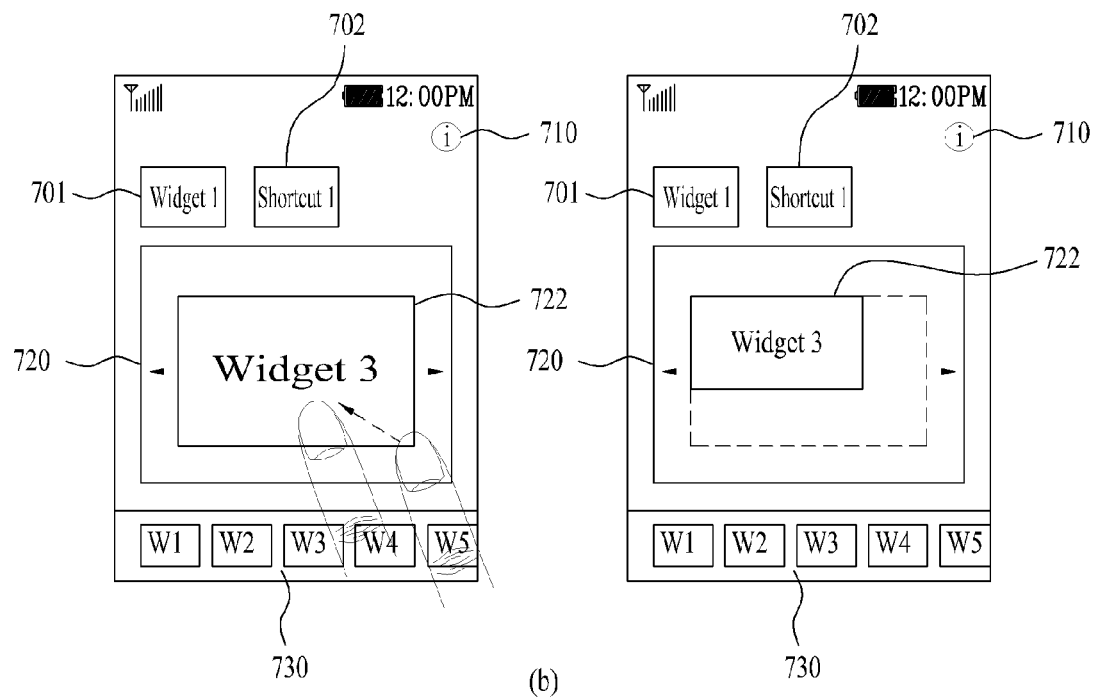
Figure 7E:
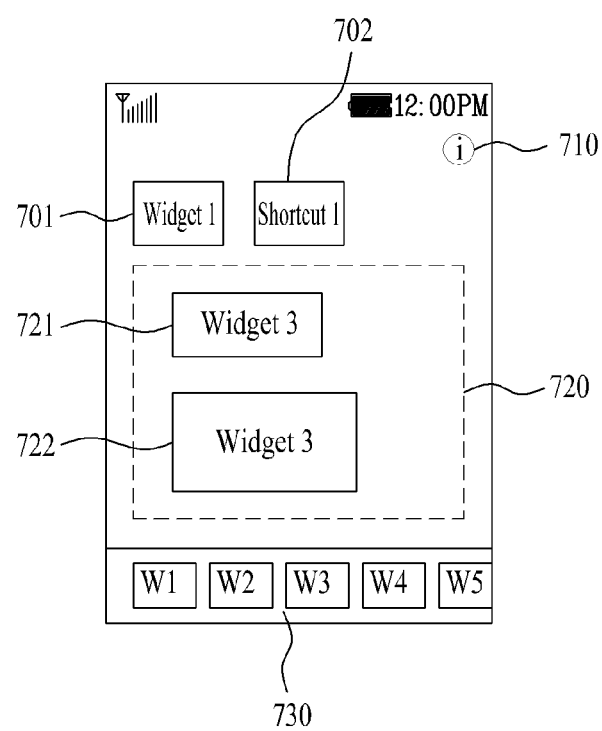

Referring to FIG. 7D, a size of at least one of the first subordinate widgets (W3-1) 721 and the second subordinate widget (W3-2) 722 can be changed on the region 720. Thus, Referring to FIG. 7E, the first subordinate widget (W3-1) 721 can be displayed with the second subordinate widget (W3-2) 722 on that region 720. The locations of the first subordinate widget (W3-1) 721 and the second subordinate widget (W3-2) 722 can be determined by a user' action (ex, touch drag action) for setting the locations.

Meanwhile, if a prescribed point within the display region of the setting candidate group 730 is touched while displaying a subordinate widget on the settable region 720 in FIG. 7B, the controller 180 can stop displaying the subordinate widget (i.e., return to the status shown in FIG. 4C).

Referring again to FIG. 3, in the setting step S350, the controller 180 can receive an input of a touch & drag action from the selected specific application indicator in a prescribed direction while displaying the selected specific application indicator using the touchscreen 151.

Subsequently, the controller 180 performs a screen turning action (or a page turning action) to correspond to the input touch & drag action and can then set the specific application indicator on a currently display screen.

A process for setting an application indicator using a screen turning or page turning action will now be explained with reference to FIGS. 8A and 8B.

Figure 8A:
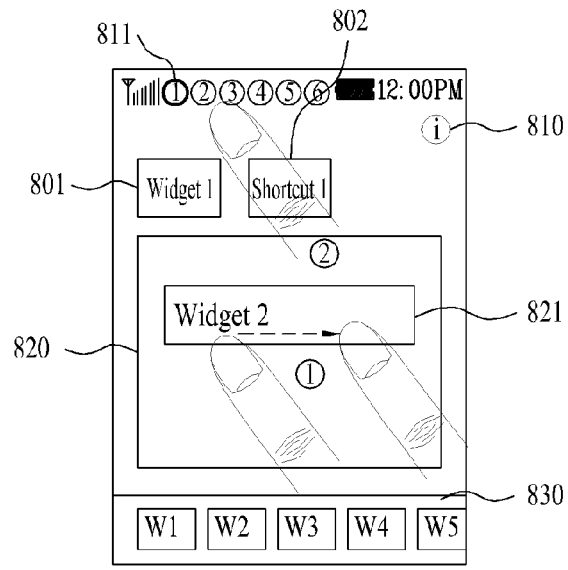
FIGS. 8A and 8B are diagrams of screen configurations for setting a widget using a screen turning or flipping action according to an embodiment of the present invention.
Figure 8A:
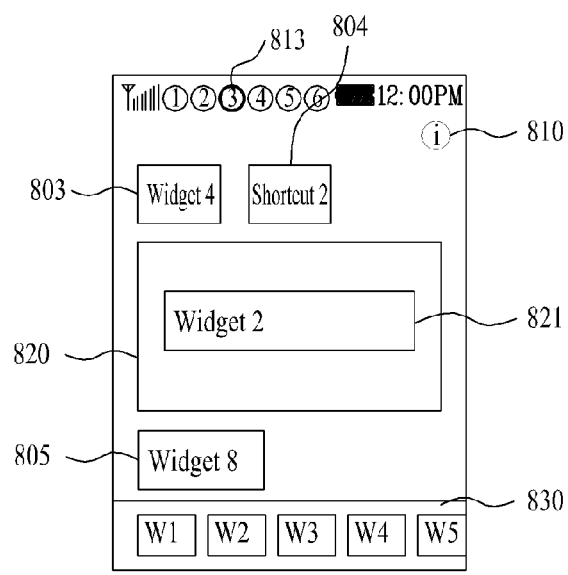

Referring to FIGS. 8A(a) and 8A(b), the user can perform a touch & drag action in a prescribed direction while a widget (W2) 821 is displayed in a real display size on a settable region 820 (①) or perform a touch action on a specific screen indicator 813 (③) among screen indicators ①, ②, ③, ④, ⑤, ⑥ and ⑦ (②).

In this instance, the screen indicators indicate a plurality of screens, respectively. In addition, each of the screen indicators can indicate that the corresponding screen is a specific page using a numeral corresponding to the screen. When receiving the touch & drag action (①) in FIG. 8A(a), the controller 180 performs a screen turning action and turns the pages to match a direction, distance and speed of the touch & drag action. For instance, when a current screen is a first page, and if a distance of the touch & drag action increases, the multiple screens are turned based on the distance of the touch & drag action.

Referring to FIG. 8A(b), as the controller 180 performs the screen turning action according to the touch & drag action (①) in FIG. 8A(a) or the touch action (②) on the specific page indicator 813 (③) in FIG. 8A(b), the controller 180 displays a screen (hereinafter named a third screen) corresponding to a third page and displays a widget (W2) 821 in a real display size within the settable region 820 of the third screen.

Figure 8B:
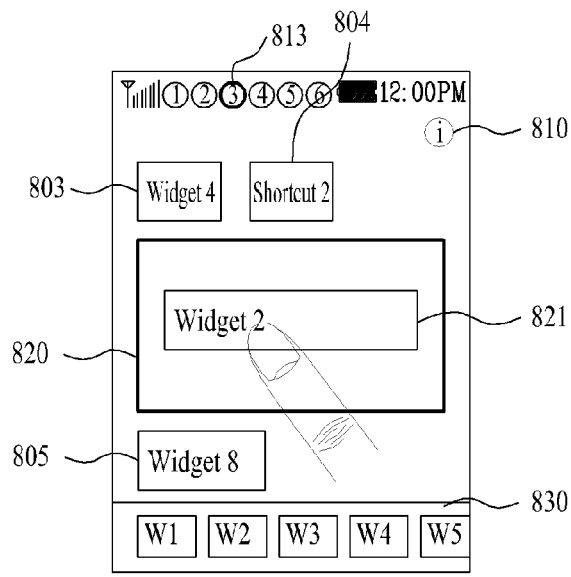
Figure 8B:
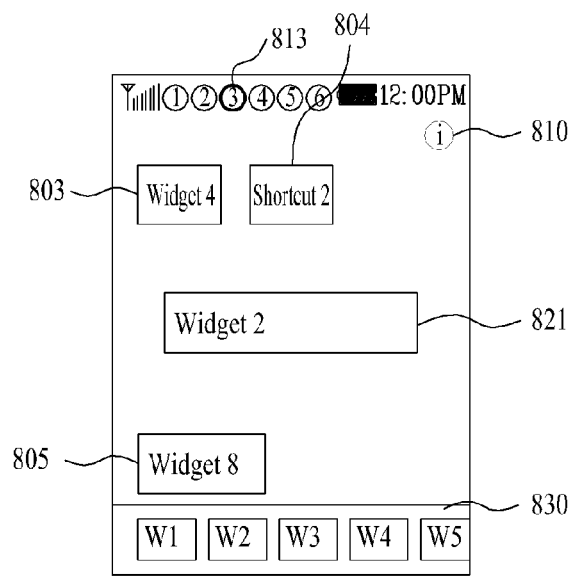

Referring to FIG. 8B, when the user performs a touch action on the widget (W2) 821 in FIG. 8A(b), the controller 180 displays a thick outline of the settable region 820, for example, of the settability information (FIG. 8B(a)) and can then set the widget (W2) 821 as a widget for the third screen (FIG. 8B(b)). In particular, the touch action in FIG. 8B(a) can have a touch pattern (e.g., a touch maintained over a predetermined duration, touches performed over a predetermined count, etc.) for commanding a setting on the third screen.

Referring now to FIG. 3, in the setting step S350, if a setting space of the specific application indicator within the current screen is insufficient, the controller 180 can perform at least one of a size adjustment of the specific application indicator, a deletion of an application indicator previously set on the current screen, combining the application indicator previously set on the current screen and shifting the specific application indicator to another screen as a setting action of the specific application indicator.

In more detail, when a real display size of a specific application indicator selected from a setting candidate group exceeds a settable region, screen configurations for setting the specific application indicator on a corresponding screen are explained with reference to FIGS. 9A to 9C.

Figure 9A:
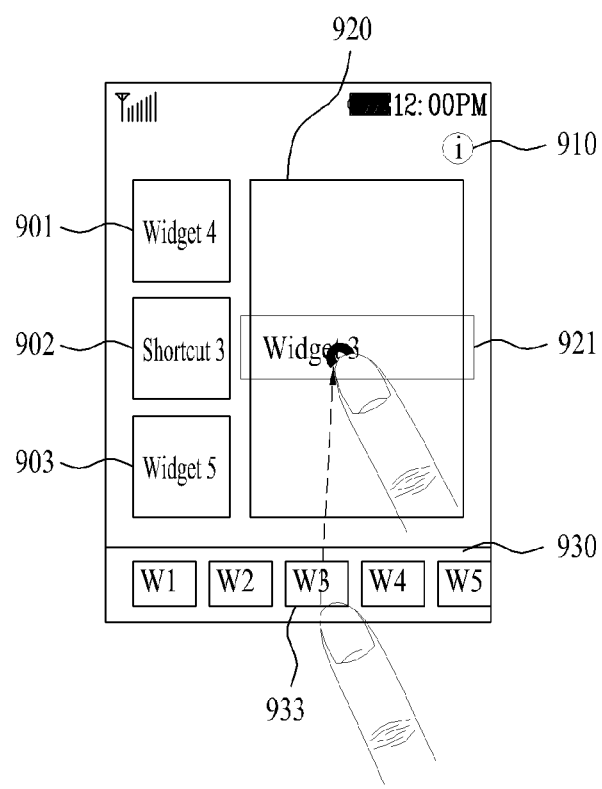
FIGS. 9A to 9E are diagrams of screen configurations for setting a specific widget on a corresponding screen when a size of the specific widget exceeds a settable region according to an embodiment of the present invention.

Referring to FIG. 9A, a widget (W3) 921 in a real display size corresponding to a widget (W3) 933 selected from a setting candidate group 930 exceeds a settable region 920. Thus, referring to FIG. 9B, the controller 180 can delete a widget (W5) 903 among application indicators widget (W4) 901, shortcut (S3) 902 and widget (W5) 903 previously set from a current screen.

Figure 9B:
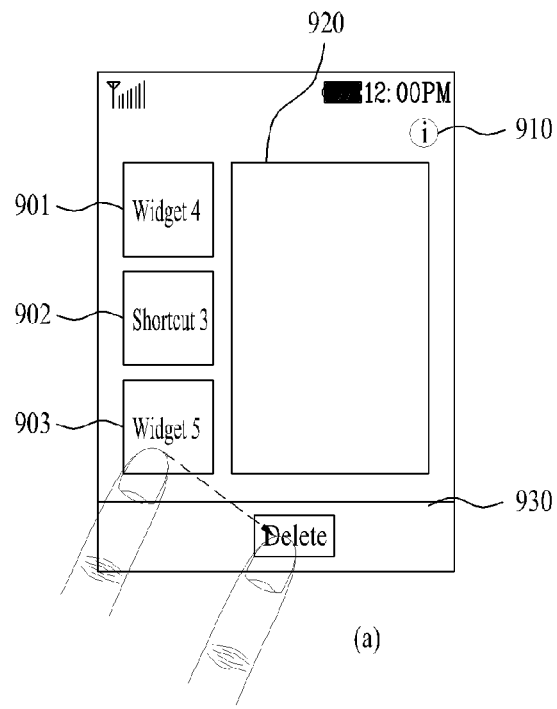
Figure 9B:
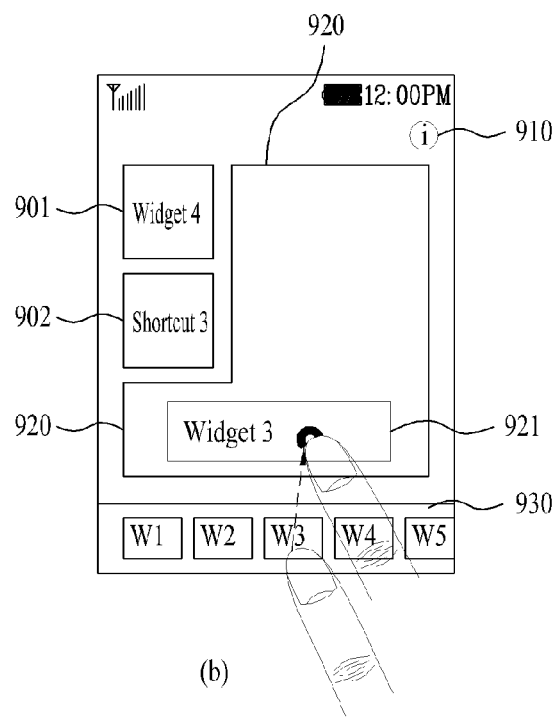

In particular, when the user performs a touch & drag action on the widget (W5) 903 to a delete zone 940 or performs a touch action on the widget (W5) 903 and the delete zone 940 (FIG. 9B(a)), the controller 180 widens the settable region 920 in size owing to the deletion of the widget (W5) 903 and can display the widget (W3) 921 within the settable region 920 (FIG. 9B(b)).

Figure 9C:
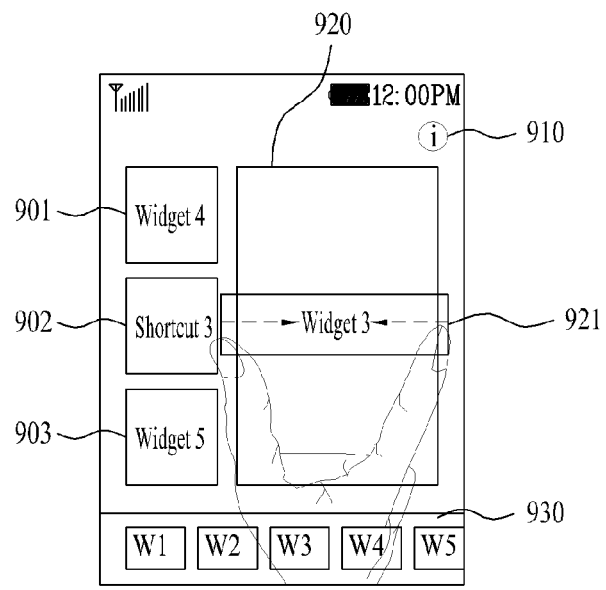
Figure 9C:
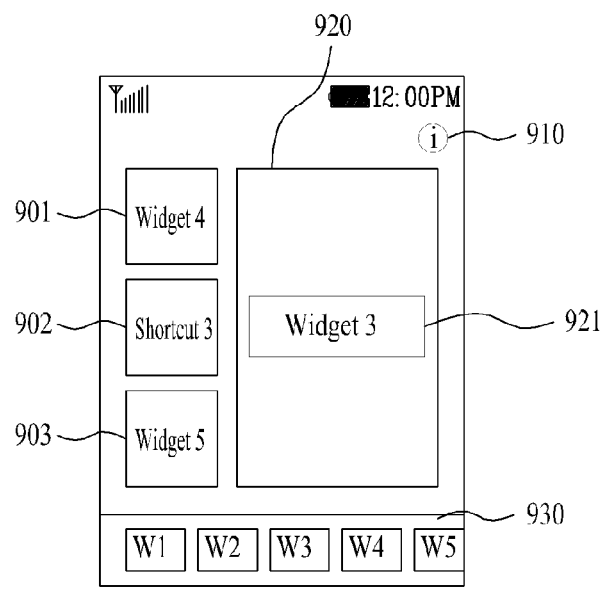

Referring to FIG. 9C(a), when the user performs a touch action (e.g., a pinch-in action) for reducing a real display size of the widget (W3) 921, the controller 180 reduces the real display size of the widget (W3) 921 to enable the widget (W3) 921 to be contained within the settable region 920 as shown in FIG. 9C(b).

Figure 9D:
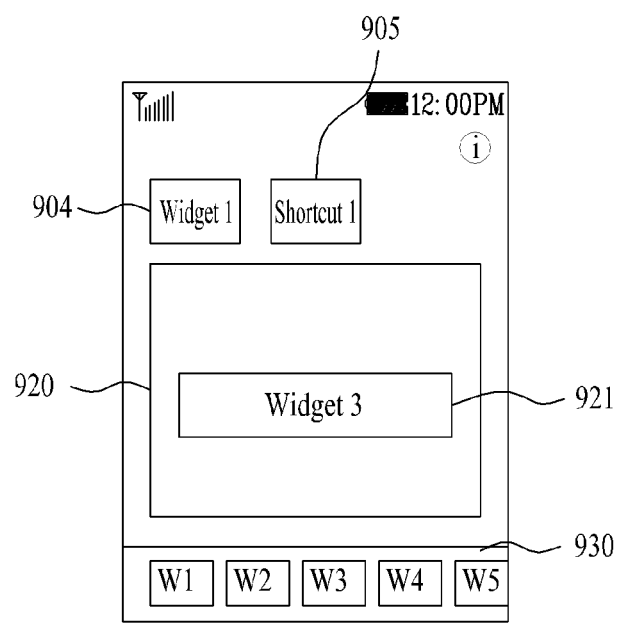

FIG. 9D is similar to FIG. 6B(b) and illustrates the widget (W3) 921 being set in the region 920 without the widgets (W4) 901 and (W5) 903 and the shortcut (S3) 902 being displayed.

Figure 9E:
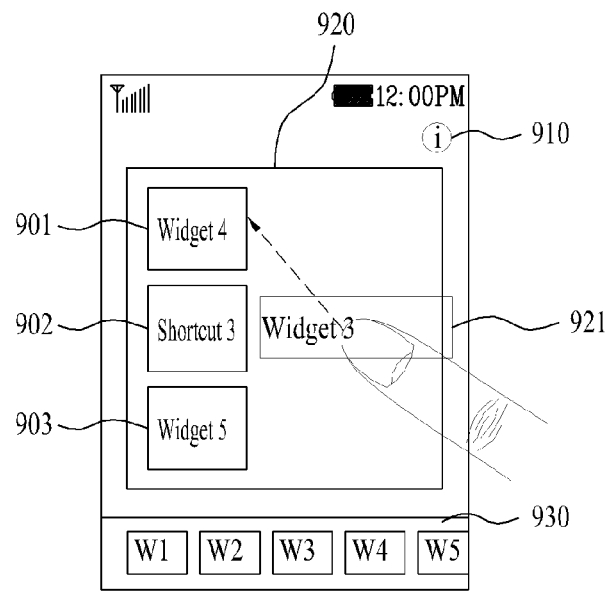
Figure 9E:
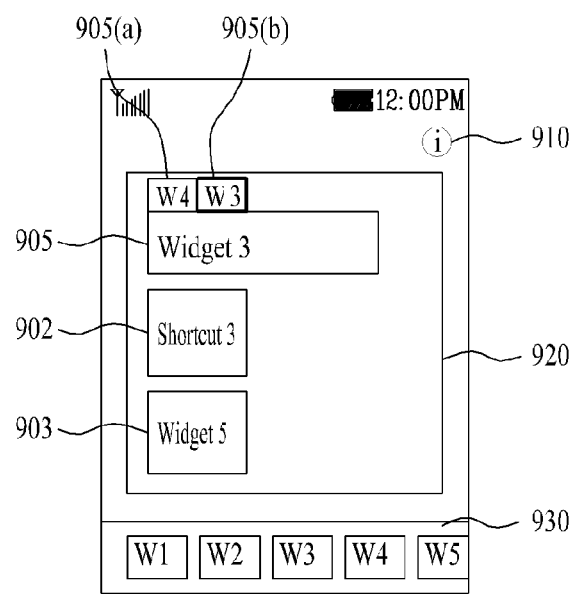

Referring to FIG. 9E(a), when the user performs a touch & drag action on the widget (W3) 921 to a specific application indicator (i.e., the widget (W4) 901) among the previously set application indicators, the controller 180 combines the widget (W4) 901 and the widget (W3) 921 together and sets a combined widget 905 including the two widgets as shown in FIG. 9E(b). The combination may be performed on the preview state of an editor mode.

In this instance, an actual display size of the combined widget 905 can be the same as the larger one of the widget (W4) 901 and the widget (W3) 921. In addition, the combined widget 905 can include indicators 905(a) and 905(b) indicating the combined widget (W3) and widget (W4), respectively (FIG. 9E). Moreover, a position or size of the settable region 920 can be adjusted to enable the widget (W3) 921 to be set in accordance with an arrangement change of the previously set application indicators 901 to 903.

Referring again to FIG. 3, in the setting step S350, the controller 180 can delete an application indicator previously set on the current screen. Therefore, a setting of the deleted application indicator can be cancelled from the current screen.

In more detail, the following description describes screen configurations for deleting a prescribed one of a plurality of application indicators set on a screen with reference to FIGS. 10A to 10D.

Figure 10A:
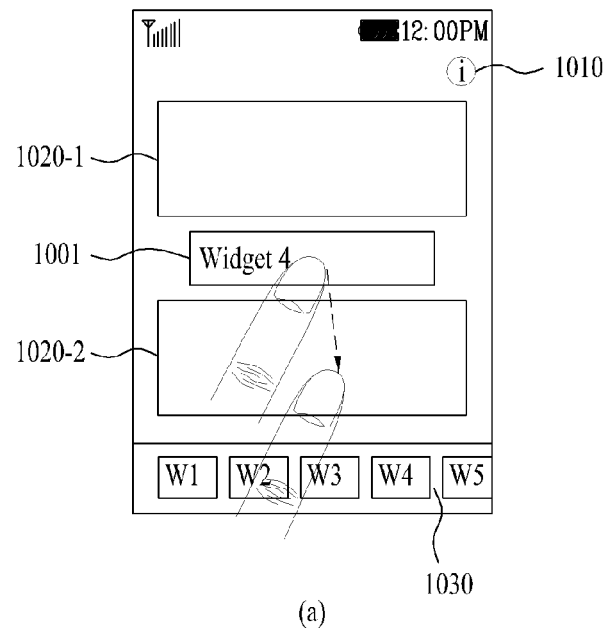
FIGS. 10A to 10D are diagrams of screen configurations for deleting a prescribed application indicator according to an embodiment of the present invention.
Figure 10A:
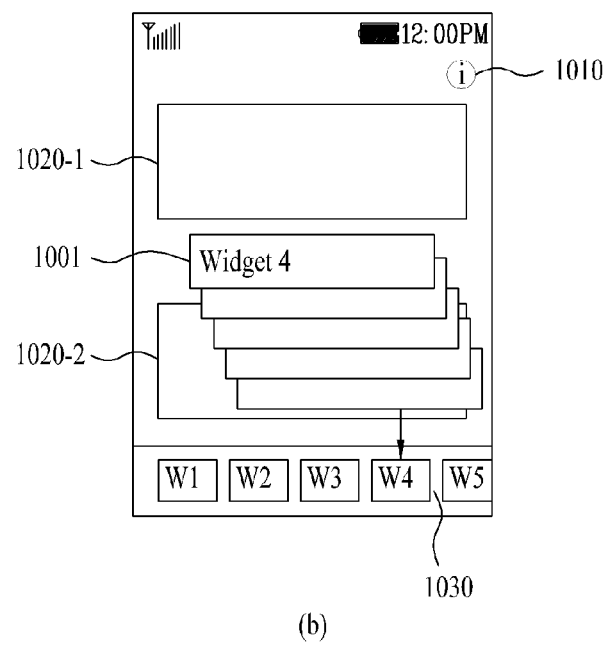

Referring to FIG. 10A(a), while a first settable region 1020-1, a second settable region 1020-2 and a widget (W4) 1001 (i.e., a preset widget) situated between the first and second settable regions 1020-1 and 1020-2 are displayed on a current screen, the user can input a delete command for the widget (W4) 1001.

For instance, the delete command signal can be input via a touch & drag action on the widget (W4) 1001 to a setting candidate group 1030, a touch action on each of the widget (W4) 1001 and a delete command zone, a selection of a menu item corresponding to a delete command after canceling a touch to the widget (W4) 1001, or the like.

Figure 10B:
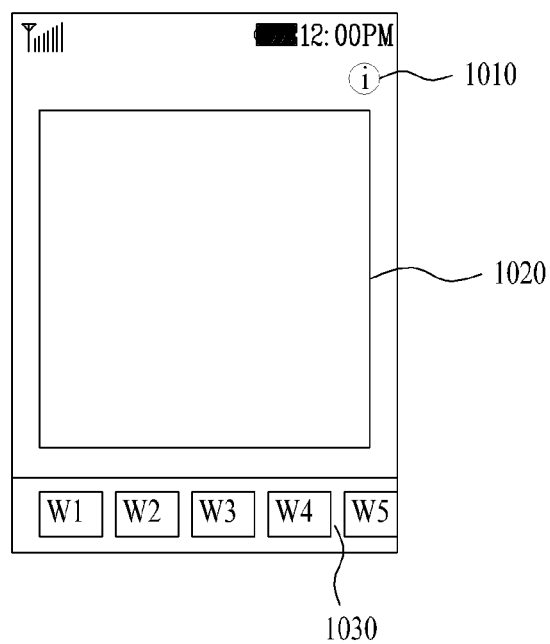

Referring to FIG. 10A(b), when the user inputs the delete command in FIG. 10A(a), the controller 180 can display a process of the widget (W4) 1001 gradually moving into a position within the setting candidate group 1030 corresponding to the widget (W4) 1001. Referring to FIG. 10B, if the setting of the widget (W4) 1001 is cancelled from the current screen, the controller 180 stops displaying the widget (W4) 1001 and can unify the first and second settable regions 1020-1 and 1020-2 into a single settable region 1020.

Figure 10C:
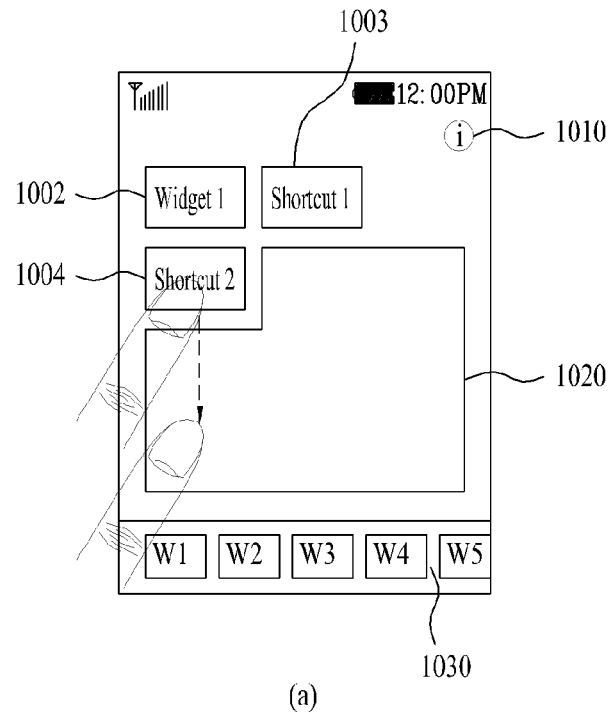
Figure 10C:
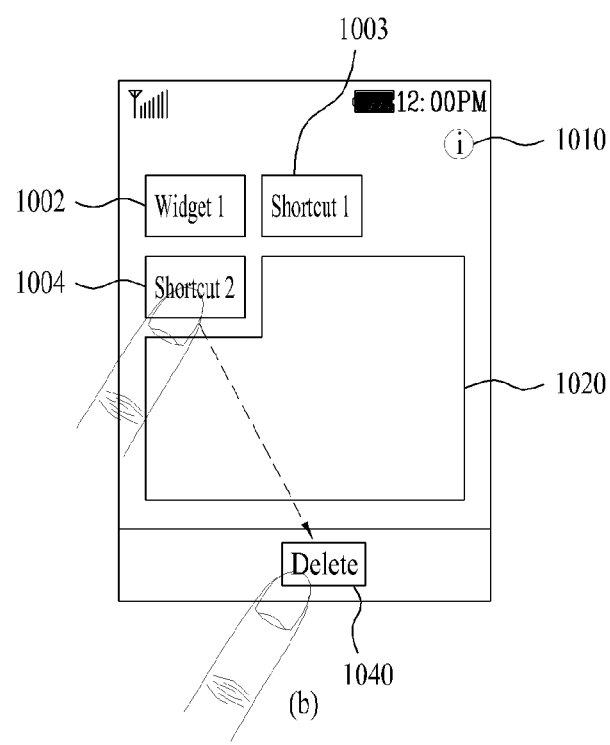

Referring to FIG. 10C(a), the controller 180 can display the settable region 1020 and application indicators (i.e., widget (W1) 1002, shortcut (S1) 1003 and shortcut (S2) 1004), which are previously set for the current screen, on the current screen. Referring to FIG. 10C(b), when the user inputs the delete command for the shortcut (S2) 1004 in FIG. 10C(a), the controller 180 stops displaying the setting candidate group 1030 and displays a delete zone 1040 on the same region. When the user inputs a touch & drag action on the shortcut (S2) 1004 to the delete zone 1040, the controller 180 can complete a delete operation of the shortcut (S2) 1004.

Figure 10D:
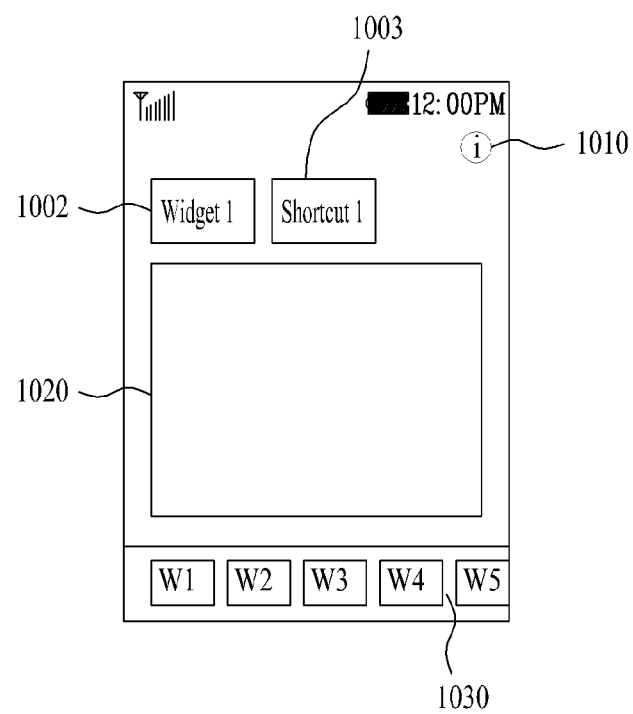

Referring to FIG. 10D, as the setting of the shortcut (S2) 1004 is cancelled from the current screen, the controller 180 does not display the shortcut (S2) 1004 on the current screen and increases the size of the settable region 1020 owing to the deletion of the shortcut (S2) 1004.

Further, the icon (i) 410/610/710/810/910/1010 shown in the former drawings can be selected for returning to the edit target list display state shown in FIG. 4B or the state before the entry into the edit mode shown in FIG. 4A. That is, if the icon 410/610/710/810/910/1010 is selected, the controller 180 can go back to the state shown in FIG. 4B or 4A.

Referring again to FIG. 3, in the setting step S350, if an application indicator previously set for the currently displayed screen exists, the controller 180 can combine a specific application indicator and the previously set application indicator. In more detail, the following description describes a process for combining a plurality of application indicators with reference to FIGS. 11A to 13B.

Figure 11A:
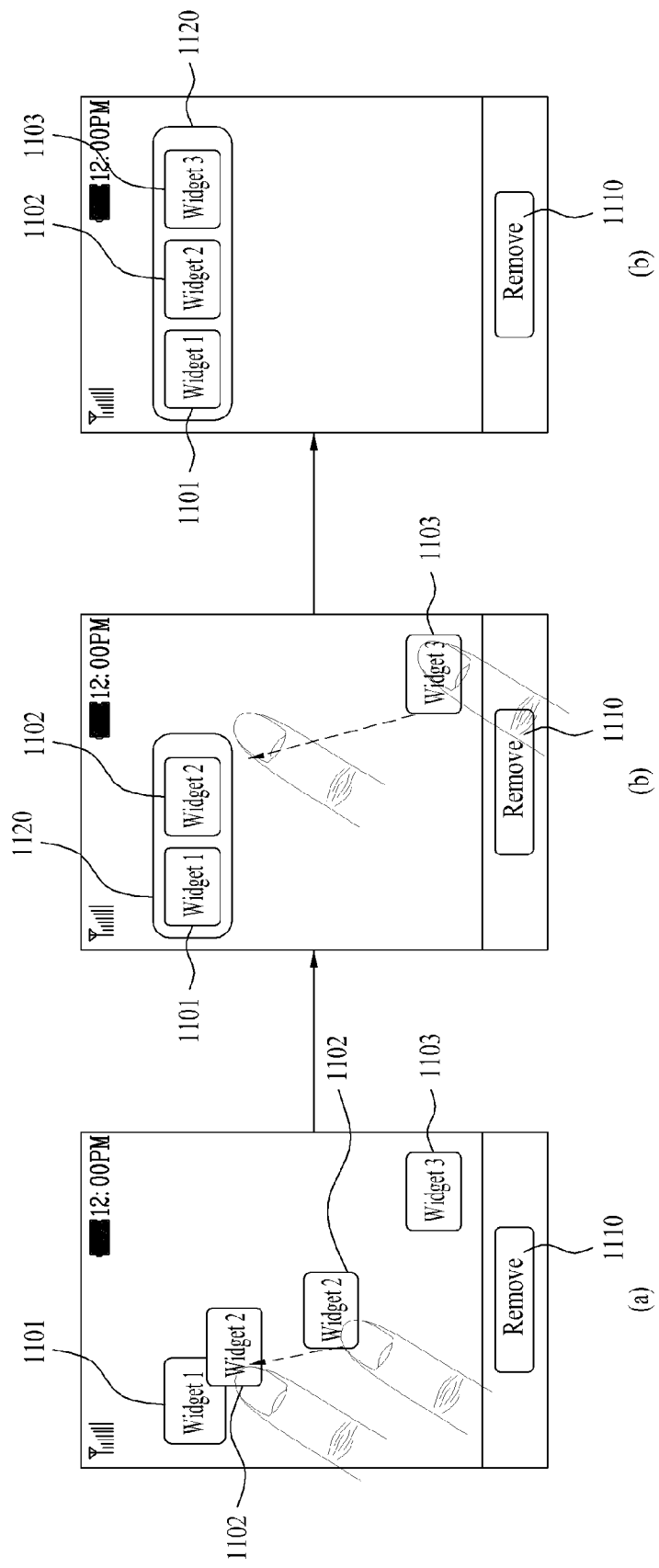

For example, FIGS. 11A and 11B show an inter-widget combination setting. Referring to FIG. 11A, the controller 180 displays a widget (W1) 1101, a widget (W2) 1102 and a widget (W3) 1103 on a current screen. When the user performs a touch & drag action on the widget (W2) 1102 to the widget (W1) 1101 in FIG. 11A(a), the controller 180 combines the first widget (W1) 1101 and the widget (W2) 1102 and displays the combined widgets on a panel 1101 as shown in FIG. 11A(b).

When the user performs a touch & drag action on the widget (W3) 1103 to the panel 1101 in FIG. 11A(b), the controller 180 combines the widget (W3) 1103 with the widget (W1) 1101 and widget (W2) 1102 and displays the combined widgets on a panel 1120 in parallel as shown in FIG. 11A(c).

In doing so, if the widget (W2) 1102 or the widget (W3) 1103 is overlapped with the widget (W1) 1101 in a predetermined range due to the touch & drag action in FIG. 11A(a) or 11A(b), the controller 180 can output information indicating that the combination setting is available. For instance, the controller 180 can output the information about the generation and display of the panel 1101 via a corresponding voice, a corresponding alarm sound, a corresponding alarm vibration and the like.

Referring to FIG. 11B(a), when the user performs a touch & drag action on the widget (W2) 1102 in the panel 1120 to a delete zone 1110, the controller 180 releases the widget (W2) 1102 from the combination setting and can simultaneously release the corresponding screen from the setting of the widget (W2) 1102 as shown in FIG. 11B(b).

When the user performs a touch & drag action from one point of the panel 1120 to the delete zone 1110 in FIG. 11B(a) or 11B(b), the controller 180 can release all of the widgets 1101 to 1103 included in the corresponding panel 1120 from the combination setting and simultaneously release the corresponding screen from the setting as shown in FIG. 11B(c).

Meanwhile, when the user performs a touch & drag action from a specific widget included in the panel to one point within the screen, the controller 180 can only cancel the combination setting while maintaining the setting of the specific widget on the screen. When the user performs a touch & drag action from one point of the panel to one point within the screen, the controller 180 can only cancel the combination setting by maintaining the setting of the entire widgets included in the panel on the corresponding screen.

Moreover, assuming the widget (W2) and the widget (W1) are combined with each other in which the widget (W2) moves into the widget (W1), the widgets can be arranged on the panel such that the widget (W1) is followed by the widget (W2).

Figure 12A:
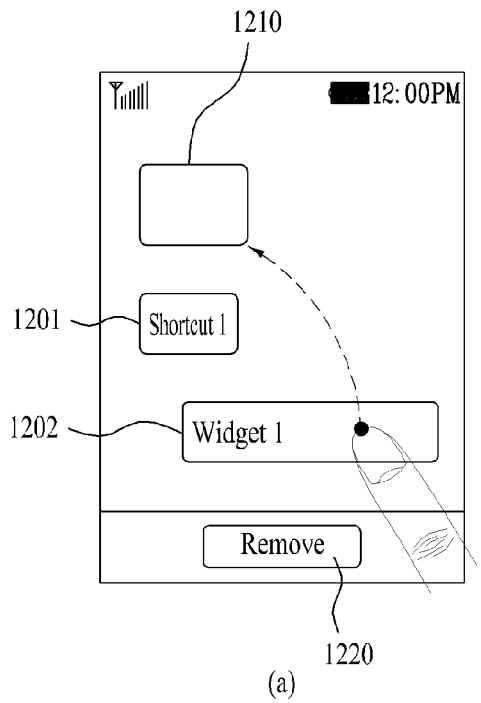
Figure 12A:
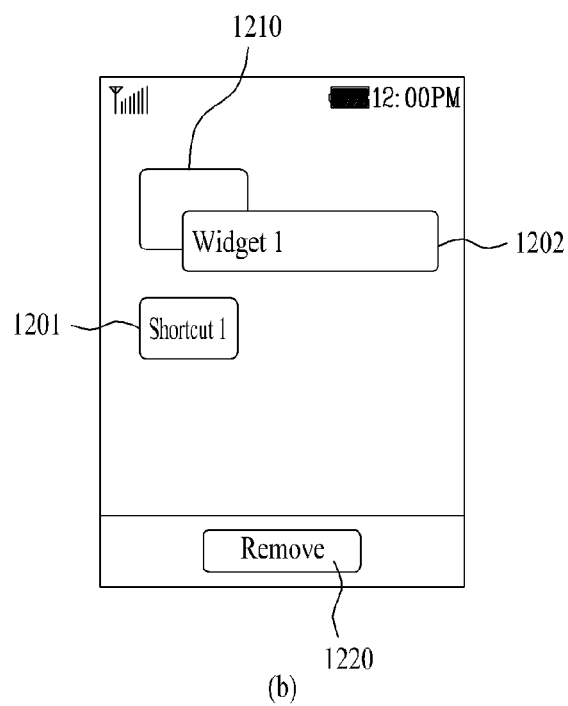
Figure 12B:
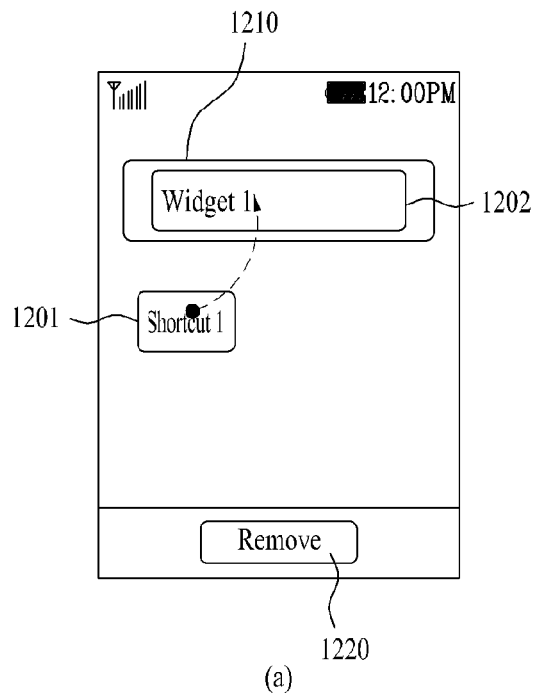
Figure 12B:
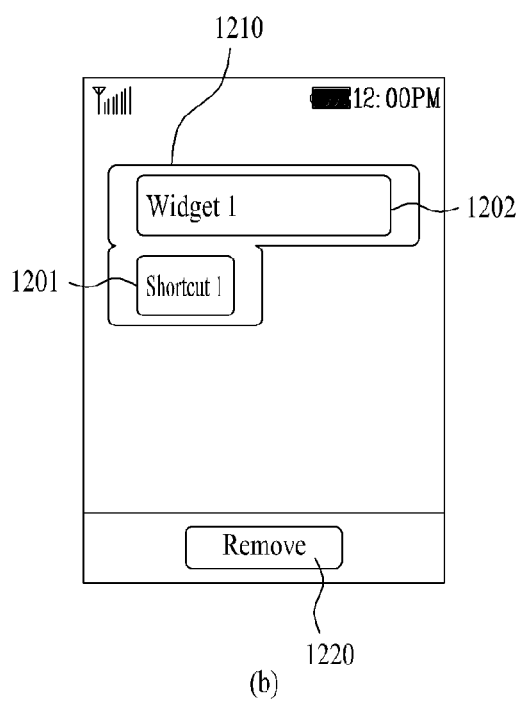

Next, FIGS. 12A and 12B show a combination setting between a widget and a shortcut. Referring to FIG. 12A(a), the controller 180 can display a fixed panel 1210, a shortcut (S1) 1201 and a widget (W1) 1202 on the screen. In this instance, the shortcut (S1) 1201 and the widget (W1) 1202 are set on the screen.

When the user performs a touch & drag action from the widget (W1) 1202 to the fixed panel 1210 in FIG. 12A(a), the controller 180 can display the widget (W1) 1202 within the fixed panel 1210 as shown in FIG. 12A(b). In doing so, if a size of the widget (W1) 1202 is greater than that of the fixed panel 1210, the controller 180 can enlarge the fixed panel 1210 to enable the widget (W1) 1202 to be included in the fixed panel 1210.

Referring to FIG. 12B(a), when the user performs a touch & drag action from the shortcut (S1) 1201 to the fixed panel 1210, the controller 180 combines the widget (W1) 1202 and the shortcut (S1) 1201 and then displays the combined widget and shortcut within the fixed panel 1210 in parallel as shown in FIG. 12B(b). In doing so, the controller 180 can enlarge the fixed panel 1210 to enclose both of the widget (W1) 1202 and the shortcut (S1) 1201.

Moreover, the combination release and deletion of the widget (W1) 1202 and the shortcut (S1) 1201 enclosed in the fixed panel 1210 be performed as discussed above with reference to FIGS. 11A and 11B.

Figure 13A:
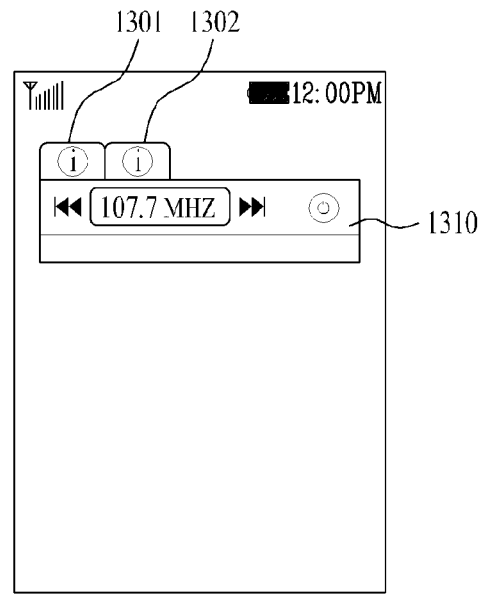
Figure 13A:
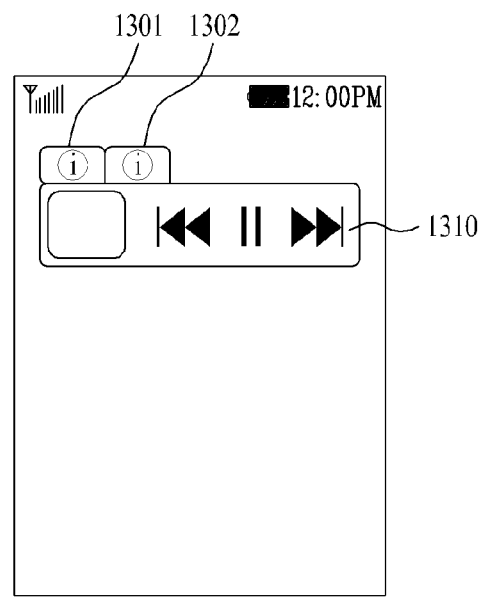
Figure 13B:
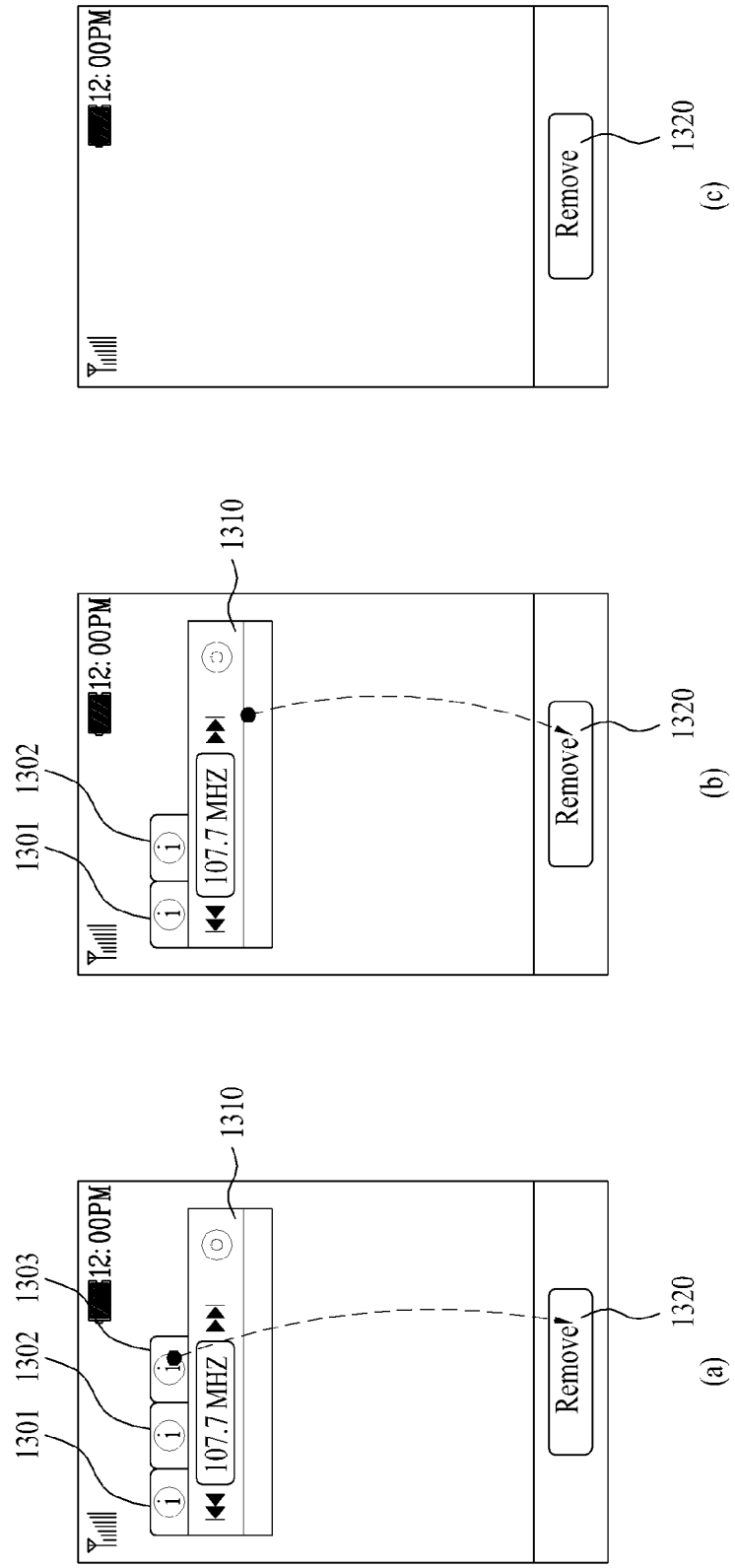

Next, FIGS. 13A and 13B show an execution of the combination-set widgets. Referring to FIG. 13A(a), if a radio widget and a music play widget are combined together (i.e., combination setting), the controller 180 displays a combined widget (W1) 310, a first indicator 1301 indicating information currently displayed on the combined widget (W1) 310 relates to the radio widget, and a second indicator 1302 indicating information currently displayed on the combined widget (W1) 310 relates to the music play widget.

In particular, while the information on the radio widget is displayed on the combined widget (W1) 310 as shown in FIG. 13A(a), and if the user selects the second indicator 1302, the controller 180 can display the information on the music play widget on the combined widget (W1) 310 as shown in FIG. 13A(b), and vice versa. The radio widget and the music play widget include information on last used contents, for example, channel information, music title, channel preview information of broadcasting program and so on.

Referring to FIG. 13B(a), when the user performs a touch & drag action from a specific indicator 1303 displayed for the combined widget (W1) 310 to a delete zone 1320, the controller 180 releases the widget corresponding to the specific indicator 1303 from the combination setting and can also release the corresponding screen from the setting as shown in FIG. 13B(b).

Further, when the user performs a touch & drag action from one point (e.g., a point except the indicator) of the combined widget (W1) 310 to the delete zone 1320 in FIG. 13B(a) or 13B(b), the controller 180 releases all of the widgets included in the combined widget (W1) 310 from the combination setting and releases the corresponding screen from the setting as shown in FIG. 13B(c).

Further, some restriction can be put on the combination-settable application indicators. For instance, the combination setting can be allowed for the application indicators corresponding to applications identical/similar to each other in property or function (e.g., watch+weather+today schedule, news+stocks, schedule+memo, SMS+MMS+email, music+video, setting related widgets, etc.). The combination setting can also be performed on any application indicators without such restriction.

The above embodiments are explained with the application indicator being the widget. The following description describes an application indicator being a shortcut with reference to FIGS. 14A to 14C. In the following description, a shortcut is called a menu.

Figure 14A:
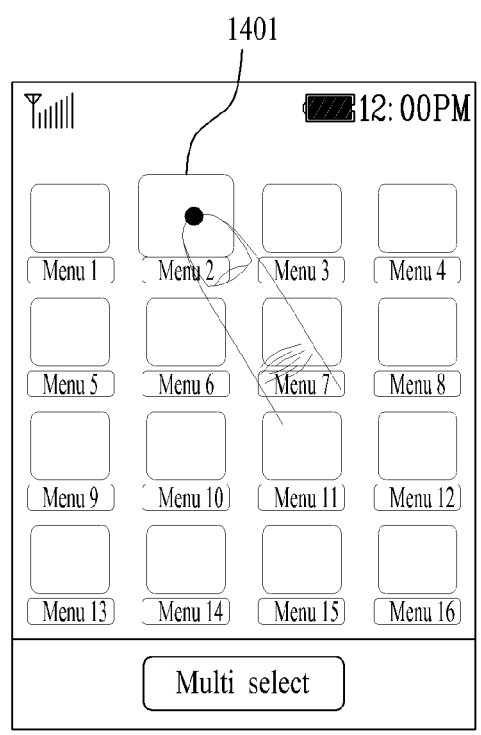
FIGS. 14A to 14C are diagrams of screen configurations for setting a shortcut on a corresponding screen according to an embodiment of the present invention.
Figure 14B:
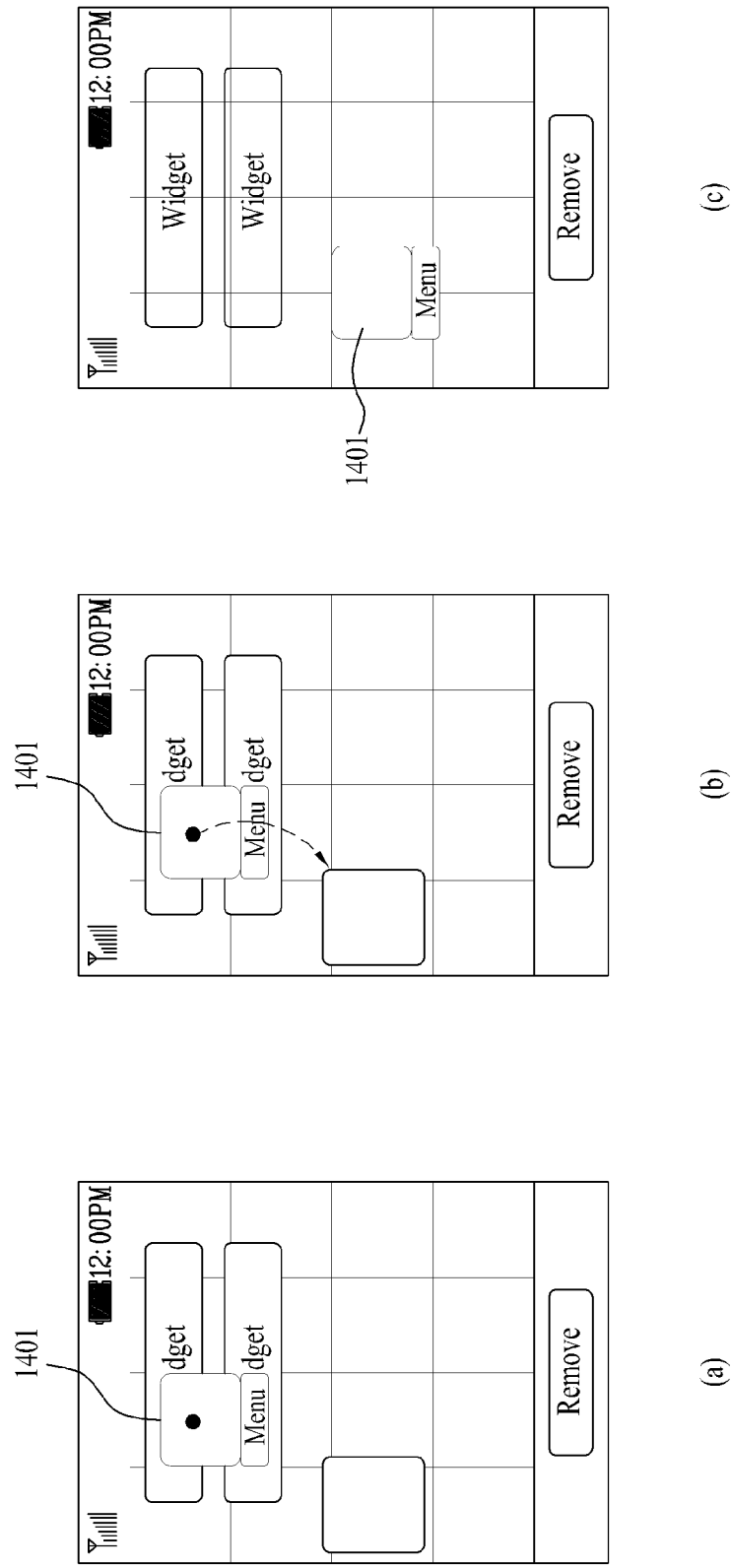
Figure 14C:
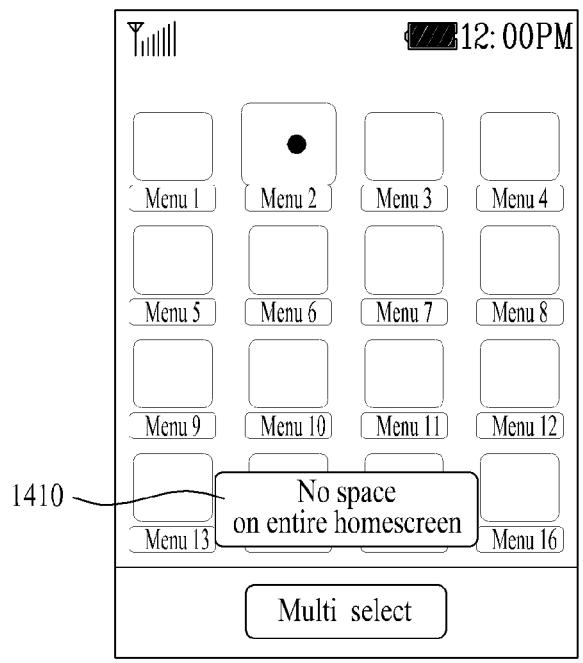

In more detail, FIGS. 14A to 14C are diagrams of screen configurations for setting a shortcut on a corresponding screen according to an embodiment of the present invention. Referring to FIG. 14A, if a user selects a shortcut in FIG. 4B, the controller 180 can display a menu list including menus, which are settable on a current screen.

Referring to FIG. 14B(a), if the menu (M2) 1401 is selected in FIG. 14A, the controller 180 stops displaying the menu list and can then display the menu (M2) 1401 to maintain its position on the menu list within the current screen. As shown in FIG. 14B(b), when the user performs a touch & drag action to a random point within the screen from the menu (M2) 1401, the controller 180 can display the menu (M2) 1401 at the random point as shown in FIG. 14B(c).

Referring to FIG. 14C, although the menu (M2) 1401 is selected in FIG. 14A, if a previous region for displaying the menu (M2) 1401 does not exist in the current screen, the controller 180 does not set the menu (M2) 1401 on the current screen but displays text 1410 indicating that there is no available region. Moreover, a plurality of menus can be selected in FIG. 14A.

The following description described various embodiments when an application indicator is a screen (i.e., a page) with reference to FIGS. 15A to 15D. In particular, FIGS. 15A to 15D are diagrams of screen configurations for editing a screen in a screen edit mode according to an embodiment of the present invention.

Figure 15A:
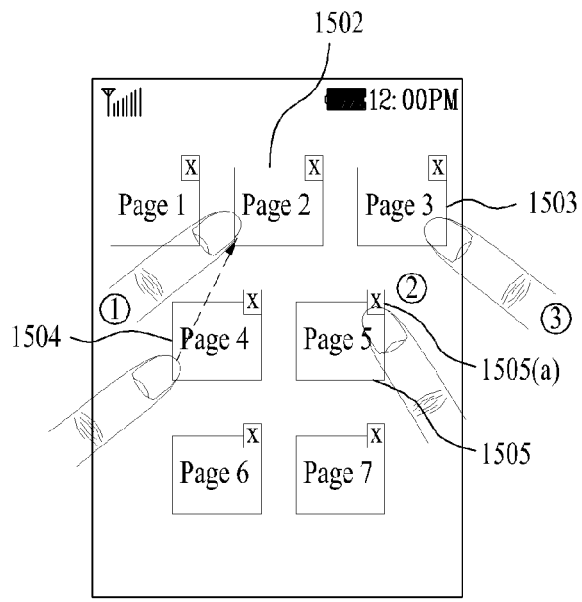
FIGS. 15A to 15D are diagrams of screen configurations for editing a screen in a screen edit mode according to an embodiment of the present invention.

Referring to FIG. 15A, if the user selects a page in FIG. 4B, the controller 180 can display page indicators of all pages current set in the terminal on the screen. In this instance, a corresponding page (a setting application indicator and a background image included) can be displayed on the page indicator. In addition, a delete zone X can be included in the page indicator to receive an input of a delete command.

Figure 15B:
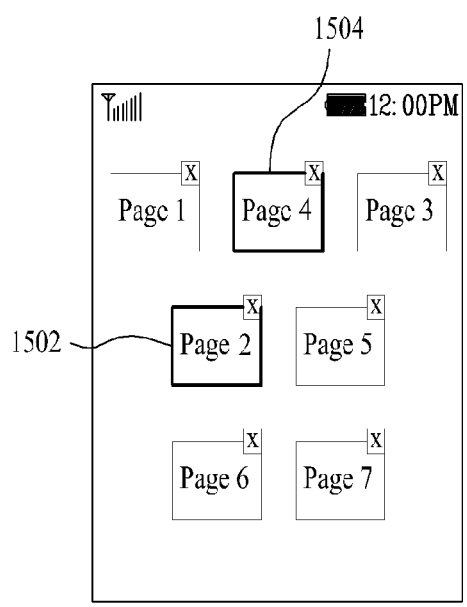

Referring to FIG. 15B, when the user performs a touch & drag action between the fourth page indicator 1504 and the second page indicator 1502 in FIG. 15A, the controller 180 can arrange the second and fourth page indicators 1502 and 1504 by switching their positions. Therefore, when a page turning action is performed, the fourth page can be displayed by following the first page instead of the second page.

Figure 15C:
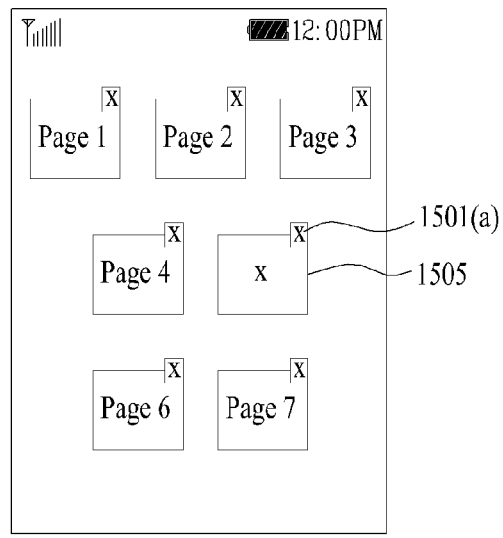

Referring to FIG. 15C, if the user selects the delete zone 1501(*a*) included in the fifth page indicator 1505 in FIG. 15A, the controller 180 deletes the fifth page corresponding to the fifth page indicator 1505 and can display an image X indicating that the corresponding page does not exist on the fifth page indicator 1505.

Figure 15D:
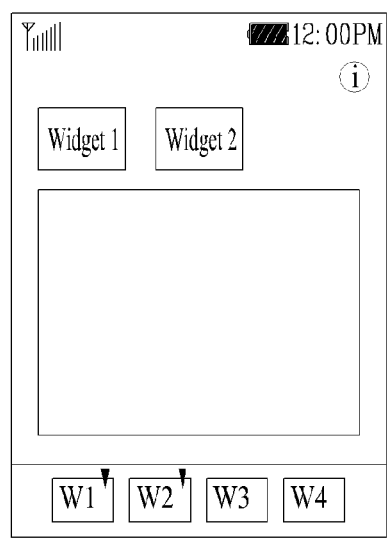

Referring to FIG. 15D, if the user selects the third page indicator 1503 in FIG. 15A, the controller 180 enters an edit mode for the third page corresponding to the third page indicator 1503 and can then display the third page in an editable state (see FIG. 4C).

According to embodiments of the present invention, when receiving a selection of at least one application indicator to download from an external server, the controller 180 can determine whether the selected application indicator is identical to a previously downloaded application indicator.

In addition, in order to cope with a result of the above determination, the controller 180 determines whether to perform a download for each selected application indicator or can determine a download type for each selected application indicator. Alternatively, the controller 180 outputs the determination result and then enables a user to determine whether to perform a download or to determine the download type.

In determining whether the selected application indicator is identical to a previously downloaded application indicator, the controller 180 can determine the category identity of a corresponding application, the identity of property, function, provided information or the like, and the identity of a corresponding application itself.

In determining the download type, the controller 180 can determine whether to combine a previous application indicator and an application indicator of an application to be downloaded into the same category, whether to perform a combination setting on a previous application indicator and an application indicator of an application to be downloaded to display them in parallel with each other within the same panel (see FIGS. 11A and 11B), whether to perform a combination setting on a previous application indicator and an application indicator of an application to be downloaded to display them with different tabs, etc. (see FIGS. 13A and 13B).

According to one embodiment of the present invention, the controller 180 can set a screen lock function on a specific screen having a specific application indicator set thereon. The controller 180 sets authentication information for the specific screen having the set screen lock function. Only if the set authentication information is input, the controller 180 can normally display the specific screen.

According an embodiment of the present invention, the above-described application indicator setting methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet).

Accordingly, the present invention provides several advantages. For example, the present invention displays a settable region before a setting of an application indicator, thereby enabling a user to be intuitively informed whether the application indicator is settable within the settable region. The present invention also enables a user to select a set point of an application indicator, thereby enabling a user to freely adjust an arrangement of the application indicator within a screen.

Thus, the user can select a setting point of the selected application indicator rather than having the terminal determine the setting point of the selected application indicator. Moreover, because information on a settable region within the corresponding screen is provided, information on whether the selected application indicator is settable can be provided before the corresponding setting.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touchscreen; and
a controller configured to:
receive a first touch input on the touchscreen,
display at least one widget candidate and information indicating a display size of a corresponding widget corresponding to one of the at least one widget candidate,
receive a second touch input selecting the one of the at least one widget candidate, and
display settability indication information indicating that the corresponding widget is available to be set on a current screen based on the received second touch input, when the selected widget candidate is displayed in a preview state of the current screen having a sufficient space for setting the corresponding widget of the indicated display size,
wherein the information displayed with the one of the at least one widget candidate indicating the display size of the corresponding widget includes text information about the display size,
wherein the settability indication information is displayed as a line that is forming a rectangular shape around the corresponding widget,
wherein the controller is further configured to display a plurality of screen indicators indicating respective different target screens on the touchscreen and to perform screen turning among the plurality of target screens in accordance with a third touch input with respect to the plurality of screen indicators, and
wherein the corresponding widget set on the current screen is displayed larger than the one of the at least one widget candidate.

2. The mobile terminal of claim 1, wherein the at least one widget candidate corresponds to a plurality of widgets belonging to a same category and differing from each other in size.

3. The mobile terminal of claim 1, wherein the controller is further configured to display the selected widget candidate in the preview state before setting the corresponding widget on the touchscreen.

4. The mobile terminal of claim 1, wherein if the controller determines a setting space of the corresponding widget is insufficient to be set on the current screen on the touchscreen, the controller is further configured to shift the corresponding widget to another screen when setting the corresponding widget.

5. The mobile terminal of claim 1, wherein the second touch input is further to place the selected widget candidate in the preview state of the current screen.

6. The mobile terminal of claim 1, wherein the controller is configured to display the corresponding widget on the current screen when the second touch input is released after the settability indication information has been displayed.

7. The mobile terminal of claim 1, wherein the controller is configured not to display the corresponding widget on the current screen when the second touch input is released before the settability indication information is displayed.

8. The mobile terminal of claim 1, wherein the display size of the corresponding widget is larger than a display size of the one of the at least one widget candidate.

9. The mobile terminal of claim 5, wherein in response to releasing the second touch input, the controller is further configured to stop displaying the settability indication information and setting the corresponding widget on the touchscreen at a location corresponding to the previously displayed settability indication information.

10. The method of claim 6, wherein in response to releasing the touch operation, the method further includes stop displaying the settability indication information and setting the corresponding widget at a location corresponding to the previously displayed settability indication information.

11. A method of controlling a mobile terminal, the method comprising:
allowing, via a wireless communication unit on the mobile terminal, wireless communication with at least one other terminal;
receiving, via a controller of the mobile terminal, a first touch input on the touchscreen;
displaying, via a touchscreen of the mobile terminal, at least one widget candidate and information indicating a display size of a corresponding widget corresponding to one of the at least one widget candidate;
receiving, via the controller, a second touch input selecting the one of the at least one widget candidate;
displaying, via the touchscreen, settability indication information indicating that the corresponding widget is available to be set on a current screen based on the received second touch input, when the selected widget candidate is displayed in a preview state of the current screen having a sufficient space for setting the corresponding widget of the indicated display size; and
displaying a plurality of screen indicators indicating respective different target screens on the touchscreen and to perform screen turning among the plurality of target screens in accordance with a third touch input with respect to the plurality of screen indicators, wherein the information displayed with the one of the at least one widget candidate indicating the display size of the corresponding widget includes text information about the display size, wherein the settability indication information is displayed as a line that is forming a rectangular shape around the corresponding widget, wherein the corresponding widget set on the current screen is displayed larger than the one of the at least one widget candidate.

12. The method of claim 11, wherein the at least one widget candidate corresponds to a plurality of widgets belonging to a same category and differing from each other in size.

13. The method of claim 11, further comprising:
displaying the selected widget candidate in the preview state before setting the corresponding widget on the touchscreen.

14. The method of claim 11, wherein if a setting space of the corresponding widget is insufficient to be set on the current screen of the touchscreen, the method further comprises shifting the corresponding widget to another screen when setting the corresponding widget.

15. The method of claim 11, wherein the second touch input is further to place the selected widget candidate in the preview state of the current screen.

16. The method of claim 11, further comprising:
displaying the corresponding widget on the current screen when the second touch input is released after the settability indication information has been displayed.

17. The method of claim 11, further comprising:
not displaying the corresponding widget on the current screen when the second touch input is released before the settability indication information is displayed.

18. The mobile terminal of claim 5, wherein the controller is configured to display the settability indication information while the second touch input is maintained on the touchscreen.

19. The method of claim 15, wherein the settability indication information is displayed while the second touch input is maintained on the touchscreen.

* * * * *